(12) United States Patent
Kurematsu

(10) Patent No.: US 12,104,663 B2
(45) Date of Patent: Oct. 1, 2024

(54) POSITIVE CLUTCH

(71) Applicant: TSUBAKIMOTO CHAIN CO., Osaka (JP)

(72) Inventor: Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/377,041

(22) Filed: Oct. 5, 2023

(65) Prior Publication Data

US 2024/0151277 A1 May 9, 2024

(30) Foreign Application Priority Data

Nov. 8, 2022 (JP) ................................ 2022-179036

(51) Int. Cl.
*F16D 41/066* (2006.01)
*F16D 7/10* (2006.01)

(52) U.S. Cl.
CPC ............. *F16D 41/066* (2013.01); *F16D 7/10* (2013.01); *F16D 2041/0665* (2013.01)

(58) Field of Classification Search
CPC ... F16D 41/066; F16D 2041/0665; F16D 7/10
See application file for complete search history.

(56) References Cited

U.S. PATENT DOCUMENTS

| | | | |
|---|---|---|---|
| 10,781,868 B2 * | 9/2020 | Hunt | F16D 23/12 |
| 2007/0010366 A1 * | 1/2007 | Larin | F16H 48/19 |
| | | | 475/249 |
| 2017/0268584 A1 * | 9/2017 | Heath | B60K 17/26 |

FOREIGN PATENT DOCUMENTS

| | | | |
|---|---|---|---|
| JP | 2020-133686 A | 8/2020 | |
| JP | 2021-120586 A | 8/2021 | |
| JP | 2021-156426 A | 10/2021 | |
| JP | 2021-156432 A | 10/2021 | |
| JP | 2022-38806 A | 3/2022 | |
| WO | WO-2010009699 A1 * | 1/2010 | F16D 41/066 |

* cited by examiner

*Primary Examiner* — Lori Wu
(74) *Attorney, Agent, or Firm* — WHDA, LLP

(57) ABSTRACT

An object of the invention is to provide a positive clutch that has a high rigidity and simple structure, and offers potential to allow easy adjustment of torque limit load, suppress friction loss and noise generation, realize a size reduction, and extend the service life. This positive clutch is configured to prohibit relative rotation of an outer and inner races by circumferentially holding each of a plurality of rollers between an outer race slope portion and an inner race slope portion. The clutch includes a torque limiter mechanism, which includes a piston member having a flat portion that forms the outer or inner race slope portion, and a resilient member that applies a constant load on the piston member. The piston member is slidably accommodated in a piston member accommodating hole formed in the outer race or the inner race.

9 Claims, 19 Drawing Sheets

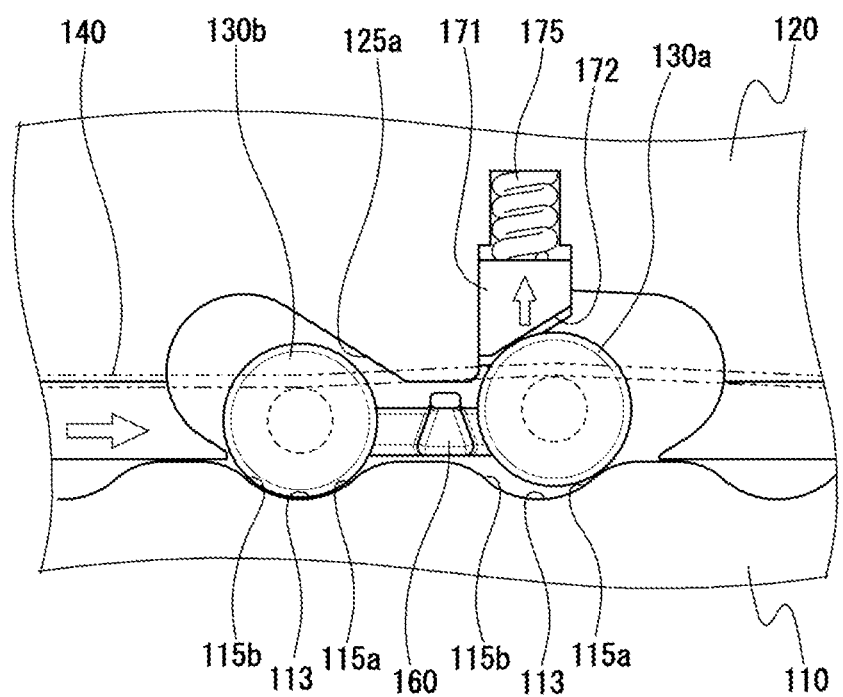
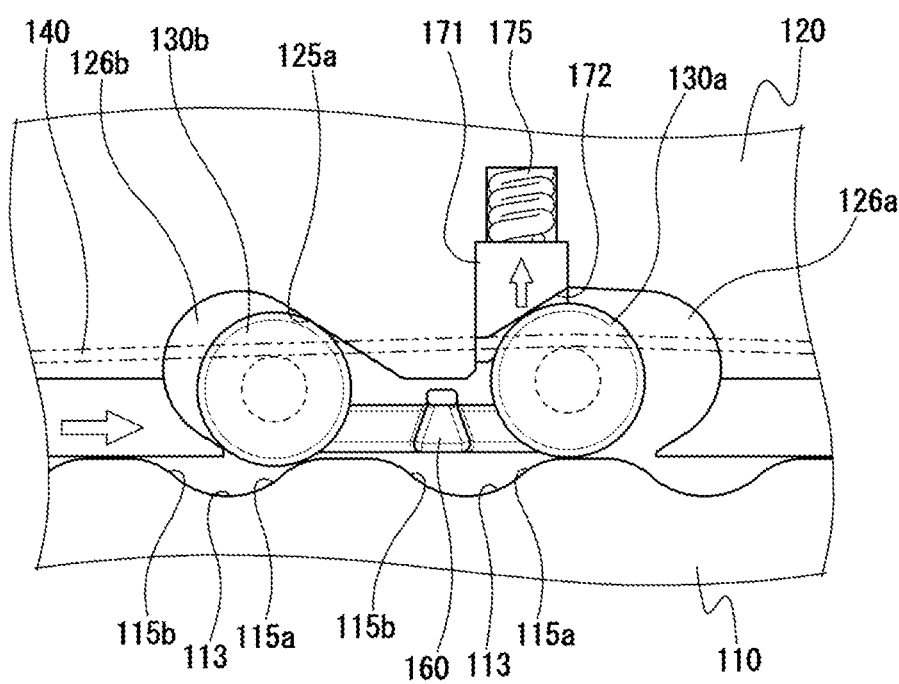

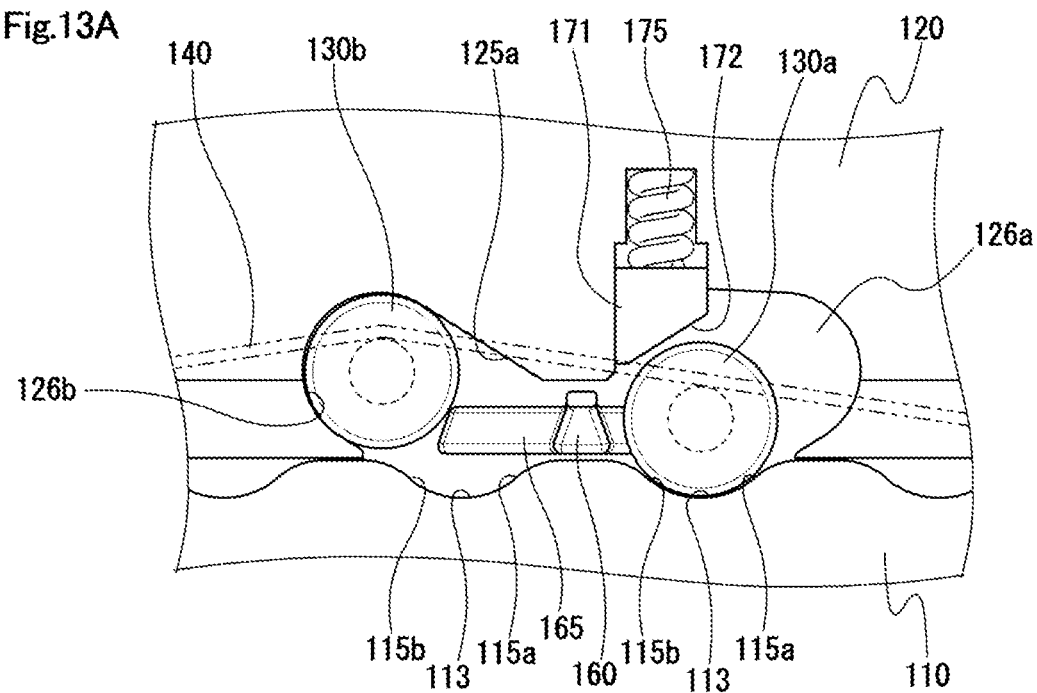
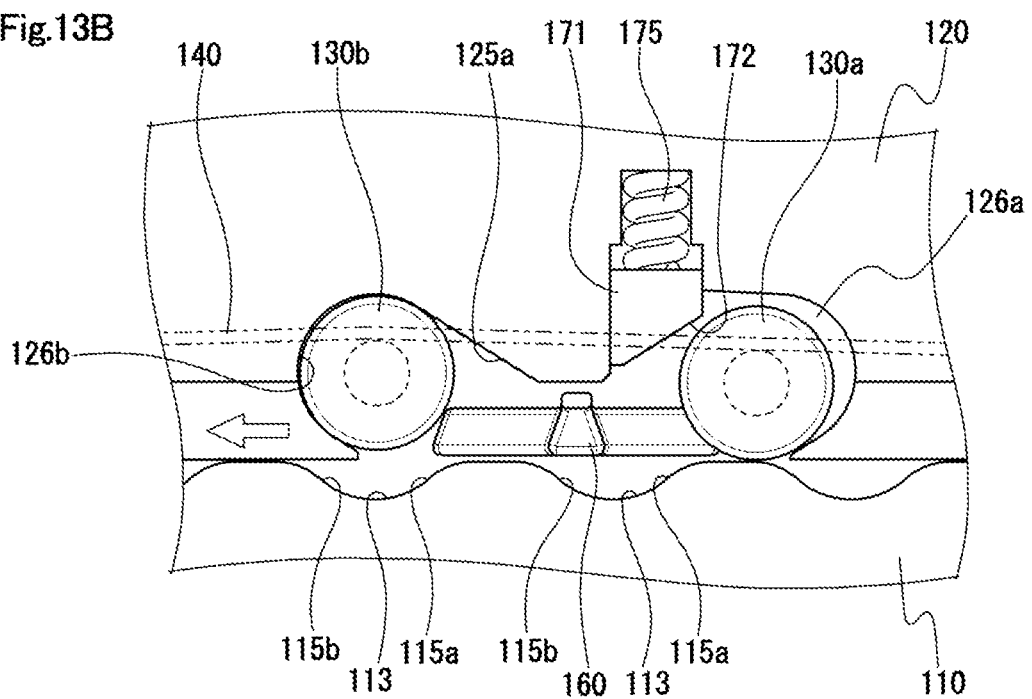

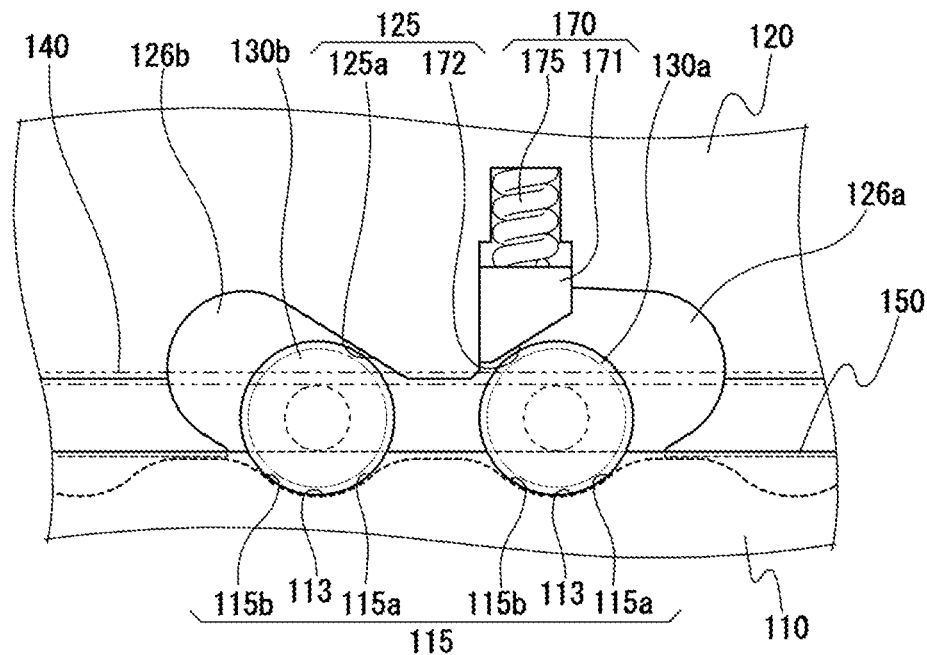
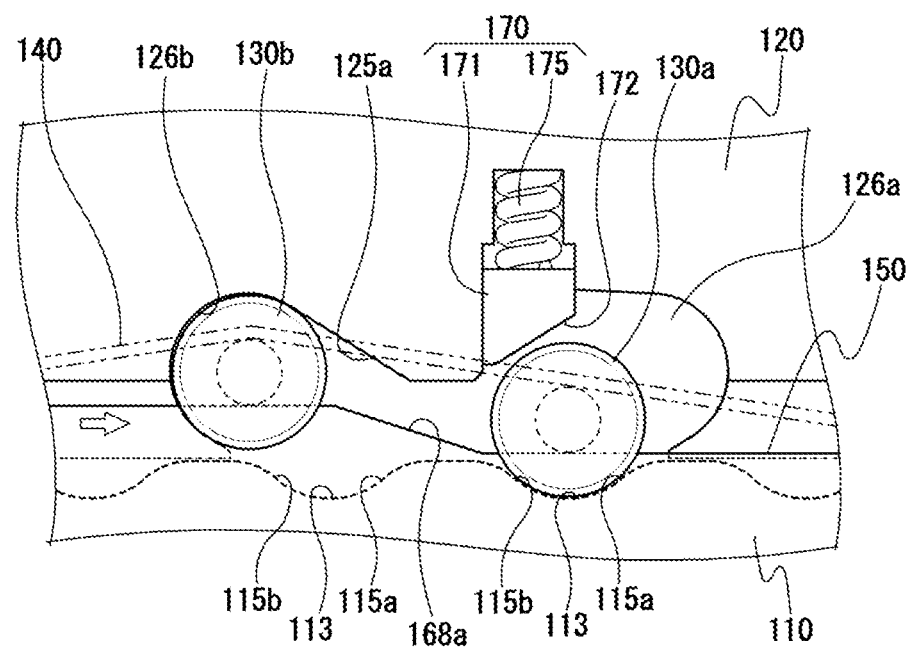

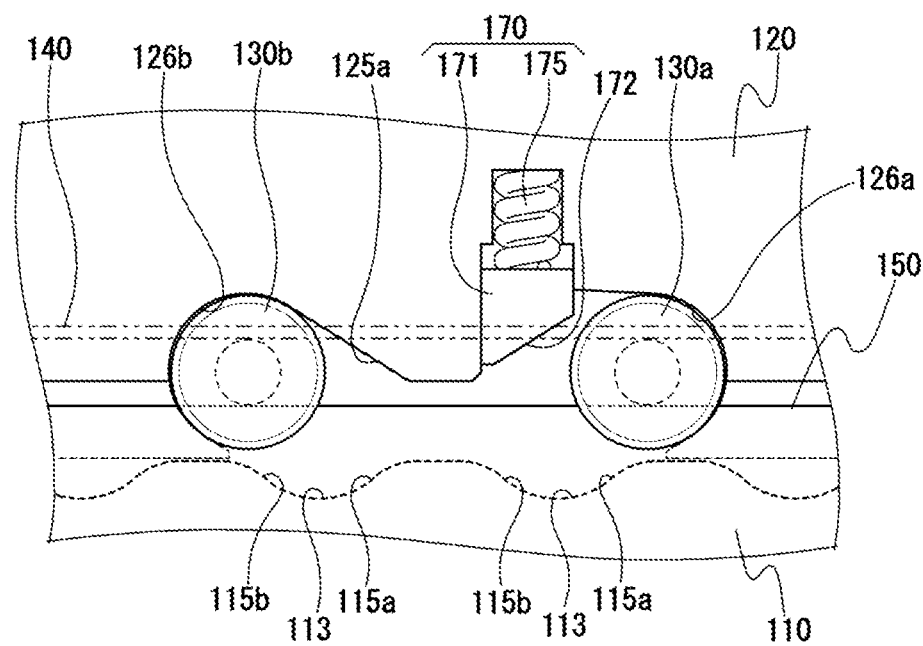
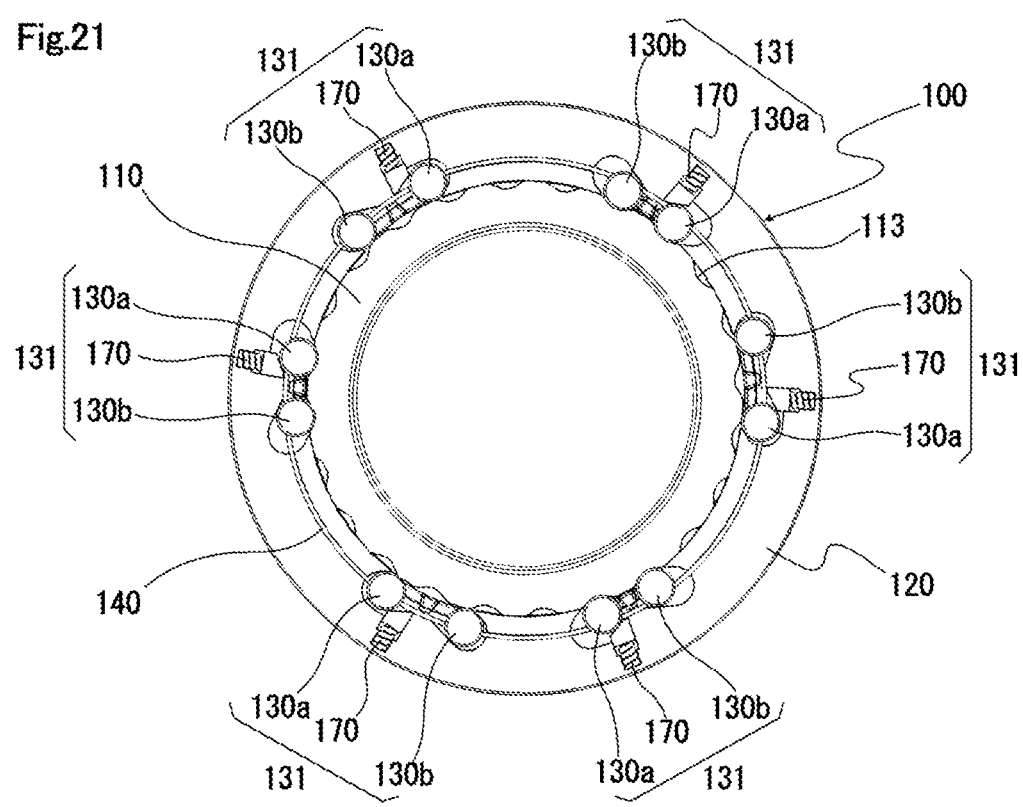

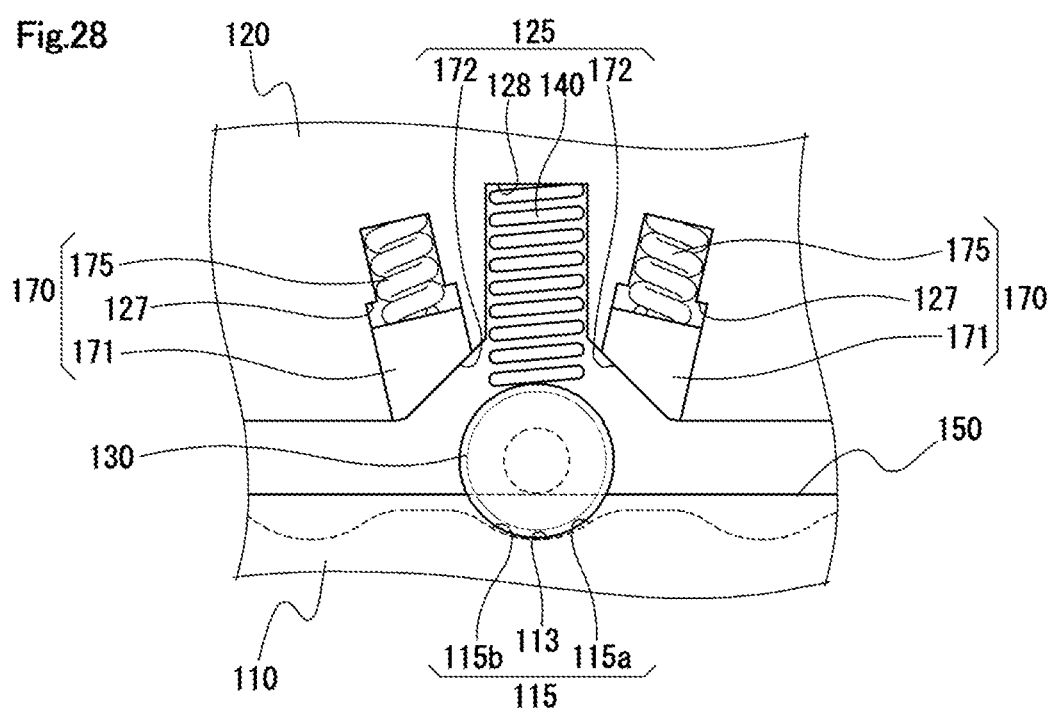

POSITIVE CLUTCH

BACKGROUND OF THE INVENTION

1. Field of the Invention

The present invention relates to a positive clutch that couples an input shaft and an output shaft by mechanical engagement.

2. Description of the Related Art

Friction clutches and positive clutches are known as mechanical clutches that transmit or interrupt torque from an input shaft to an output shaft, with the friction clutches using a frictional force while the positive clutches using mechanical engagement to couple the input shaft and the output shaft.

One known friction clutch uses a plurality of torque transmission members, such as cylindrical rollers, interposed between an inner race and an outer race that are coaxial and rotatable relative to each other (see, for example, Japanese Patent Application Publication No. 2020-133686). To transmit torque, the relative rotation between the inner race and the outer race is stopped by frictional engagement between the torque transmission members and the inner and outer races.

A ratchet-type clutch is another known positive clutch. The ratchet mechanism in the clutch is composed of a plurality of pawls for example (which act as torque transmission members) provided in inner circumferential portions of the outer race, and notches in outer circumferential portions of the inner race for the pawls to engage with (see, for example, Japanese Patent Application Publications Nos. 2021-120586, 2021-156426, and No. 2022-038806). Such a ratchet-type clutch uses springs to bias the pawls toward the notches for stable engagement between the pawls and clutches.

Meanwhile, a clutch provided with a torque limiter mechanism such as a tolerance ring, for example, to prevent transmission of excessive torque is known (see, for example, Japanese Patent Application Publication No. 2021-156432).

In this clutch, the tolerance ring is arranged either between an outer circumferential surface of the outer race and an inner circumferential surface of an input torque transmission member, or between an inner circumferential surface of the inner race and an outer circumferential surface of the input torque transmission member. When a torque exceeding a preset torque level is input, the clutch slips between either the inner race or input torque transmission member and the tolerance ring, or between either the outer race or input torque transmission member and the tolerance ring, whereby the amount of transmitted torque is limited.

SUMMARY OF THE INVENTION

One of the issues with the friction clutch mentioned above is low rigidity due to windup, also known as torsional deflection, which occurs during torque transmission.

The ratchet-type clutch tends to have a large overall length due to the complex structure. A two-way clutch configuration, in particular, requires pairs of pawls to be disposed opposite each other as described in Japanese Patent Application Publication No. 2022-038806, which tends to increase the bulkiness. This makes it difficult to deal with high torque in the ratchet-type clutch.

Another issue with the ratchet-type clutch is the possibility of chipping upon impact or wear of the pawls because of high surface pressure applied to small torque-receiving surfaces thereof.

The performance of most torque limiter mechanisms is largely dependent on friction coefficients of friction plates or the like. In clutches with such torque limiter mechanisms, torque load control in accordance with changes in ambient conditions is difficult, and impaired durability may arise due to wear, and moreover the torque limit load may become unstable.

A torque limiter mechanism composed, for example, of springs and balls is known. Such a torque limiter mechanism has an elaborate structure and takes up a large space, which makes it difficult to use the same with a clutch. The large structure also entails the problem of an increased number of components and higher production cost.

In some cases, a separate torque limiter mechanism is used in combination with a clutch mechanism. This approach leads to an increased number of components and requires a large space for installing the clutch mechanism, because of the configuration in which the torque limiter mechanism and clutch mechanism are each designed as an independent mechanism.

Another issue with conventional torque limiter mechanisms is that it is difficult to change, for different rotating directions, the load-carrying balance of the torque limit load.

The present invention has been made based on the circumstances described above and aims at providing a positive clutch that has a high rigidity and simple structure, and offers potential to allow easy adjustment of torque limit load, suppress friction loss and noise generation, realize a size reduction, and extend the service life.

The present invention achieves the above object by providing a positive clutch including: an outer race and an inner race that are coaxial and rotatable relative to each other; a plurality of rollers disposed between the outer race and the inner race; and a biasing means radially biasing each of the plurality of rollers. The outer race includes a flat outer race slope portion extending at an angle to a circumferential direction, and the inner race includes a flat inner race slope portion extending at an angle to the circumferential direction. Each of the plurality of rollers prohibit relative rotation of the outer race and the inner race by being held between the outer race slope portion and the inner race slope portion in the circumferential direction. The positive clutch further includes a torque limiter mechanism that limits an amount of torque transmitted between the inner race and the outer race. The torque limiter mechanism includes a piston member having a flat portion that forms the outer race slope portion or the inner race slope portion, and a resilient member that applies a constant load on the piston member. The piston member is slidably accommodated in a piston member accommodating hole formed in the outer race or the inner race.

According to one aspect of the positive clutch of the present application, torque transmission between the inner race and the outer race is achieved by holding the rollers between the inner race slope portions and the outer race slope portions in the circumferential direction. Therefore, no windup or torsional deflection occurs when torque is transmitted, which allows the positive clutch to be designed as a high-rigidity clutch. The simple structure that achieves stable engagement allows for size reduction and the placement of a large number of rollers in a small space. This enables the transmission of high torque. Moreover, the surface pressure applied to the rollers and the inner race slope portions and outer race slope portions that hold the rollers during torque transmission can be set low, allowing the clutch to be designed with an inexpensive material that is more resistant to chipping, which may be caused by impact, or wear. Since the rollers rotate themselves and hardly engage at the same point, the durability of the clutch can be improved and its service life can be extended.

Moreover, the rollers that are engaging elements in the clutch mechanism are used as the components for moving the piston members of the torque limiter mechanisms, which reduces the number of components and enables cost reduction, as well as facilitates size reduction and structural simplification. Further, the torque limiter mechanism being a piston type that uses the resilient member allows setting of the torque limit load based on the friction force on the sliding surfaces of the piston member and the piston member accommodating hole, and on the resilient force of the resilient member. This enables easy adjustment of the torque limit load relatively more independently of friction coefficients, and helps reduce wear on the sliding surfaces, contributing to increased durability.

The configuration of another aspect allows the operating modes of the positive clutch to be switched easily. Since the rollers are separated from the inner race or outer race in the free mode in which the inner race and outer race are allowed to rotate relative to each other, friction loss and noise can be reduced.

According to the configuration of another aspect, the torque limit load is made changeable in both forward and reverse directions, which facilitates an attempt to improve performance stability.

The configuration of another aspect helps improve performance stability, and enables size reduction and structural simplification by a reduction in the number of components.

According to the configuration of another aspect, the proportion of the torque limit load carried by the friction force on the sliding surfaces of the piston member and the piston member accommodating hole, and the torque limit load carried by the resilient force of the resilient member, can be changed by adjusting the amount of friction force on the sliding surfaces of the piston member and the piston member accommodating hole, which facilitates an attempt to improve performance stability.

The configuration of another aspect enables size reduction by a reduction in the number of components and helps simplify the structure.

The configuration of another aspect helps reduce backlash and allows for smooth engagement.

The configuration of another aspect allows the rollers to roll more easily and can help reduce the ratchet noise.

The configuration of another aspect eliminates the need to provide multiple biasing means corresponding to the plurality of rollers. This reduces the number of components and helps reduce the size of the clutch.

BRIEF DESCRIPTION OF THE DRAWINGS

FIG. 11C is a diagram illustrating a state of the torque limiter mechanism activated upon input of a torque exceeding a preset torque to the outer race in the forward direction;

FIG. 11D is a diagram illustrating a state in which the outer race and inner race are disengaged and the torque is released;

FIG. 13A is a schematic diagram illustrating a standby state of the positive clutch shown in FIG. 1 when the operating mode is the forward lock mode;

FIG. 13B is a diagram illustrating a state of the positive clutch shown in FIG. 1 in the forward lock mode when the outer race is rotated in the reverse direction;

FIG. 20A is a schematic diagram illustrating a standby state of the positive clutch shown in FIG. 18 when the operating mode is the two-way lock mode;

FIG. 20B is a schematic diagram illustrating a standby state of the positive clutch shown in FIG. 18 when the operating mode is the forward lock mode;

FIG. 20C is a schematic diagram illustrating the state of the positive clutch shown in FIG. 18 when the operating mode is the two-way free mode;

FIG. 21 is a front view illustrating the configuration in another example of the positive clutch according to the third embodiment of the present invention with some parts being omitted;

FIG. 28 is a schematic diagram illustrating essential parts in another configuration example of the positive clutch according to the fourth embodiment of the present invention.

DESCRIPTION OF THE PREFERRED EMBODIMENTS

Figure 1:
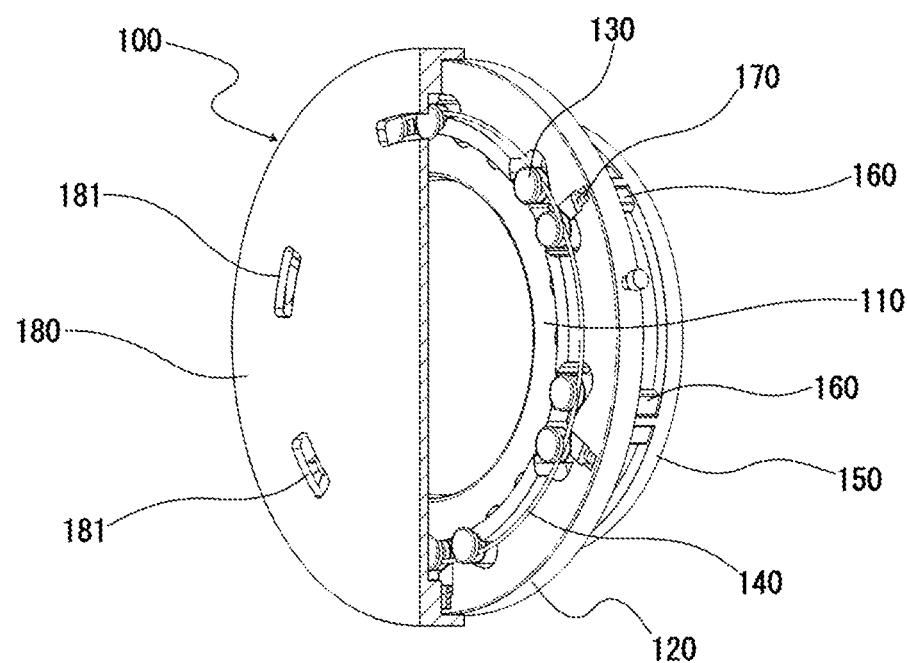
FIG. 1 is a partially broken perspective view illustrating one configuration example of a positive clutch according to a first embodiment of the present invention as seen from the front side in the axial direction.

Positive clutches according to some embodiments of the present invention are described below with reference to the drawings.

First Embodiment

As shown in FIG. 1 to FIG. 4, the positive clutch 100 according to the first embodiment includes an inner race 110 and an outer race 120 that are coaxial and rotatable relative to each other, a plurality of cylindrical rollers 130 disposed between the inner race 110 and the outer race 120, a biasing means 140 radially biasing each of the plurality of rollers 130, and a switching member 150 for switching the operating modes of the positive clutch 100. Reference numeral 180 in FIG. 1 to FIG. 4 denotes a cylindrical cover member with a bottom that is fitted to the outer race 120 from the front side.

The positive clutch 100 according to this embodiment is configured such that the inner race 110 includes flat inner race slope portions extending at an angle to the circumferential direction, and the outer race 120 includes flat outer race slope portions extending at an angle to the circumferential direction. Relative rotation of the inner race 110 and outer race 120 is prohibited by the plurality of rollers 130 each being held between an inner race slope portion and an outer race slope portion in the circumferential direction.

The inner race 110 is cylindrical with a closed bottom on the back side in the axial direction, and includes a shaft part 112 that extends axially outward on the back side in the axial direction.

The outer race 120 is cylindrical with a closed bottom on the backside in the axial direction, and includes a disc-shaped bottom plate part 122 and a tubular part 124 that extends axially from the peripheral edge of the bottom plate part 122. A through hole is formed in the center of the bottom plate part 122 for the shaft part 112 of the inner race 110 to pass through. A bearing part 123 extends axially outward from the back side of the bottom plate part 122 to rotatably support the shaft part 112 of the inner race 110.

Figure 5:
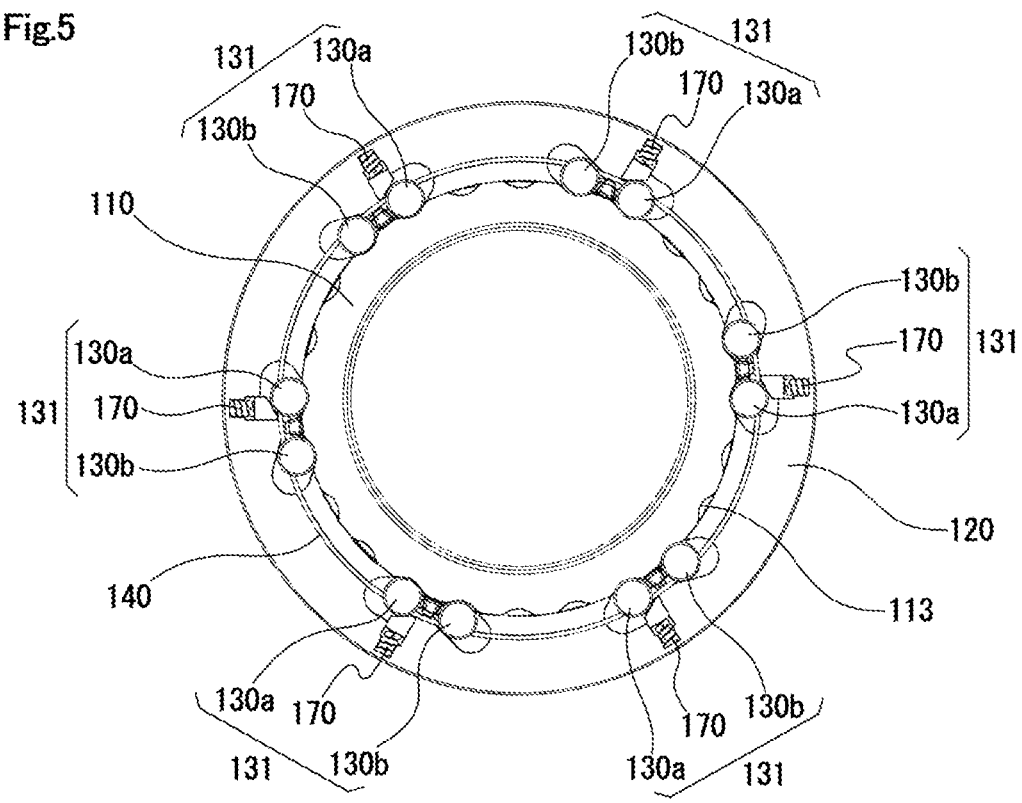
FIG. 5 is a front view of the positive clutch shown in FIG. 1 with some parts being omitted.
Figure 6:
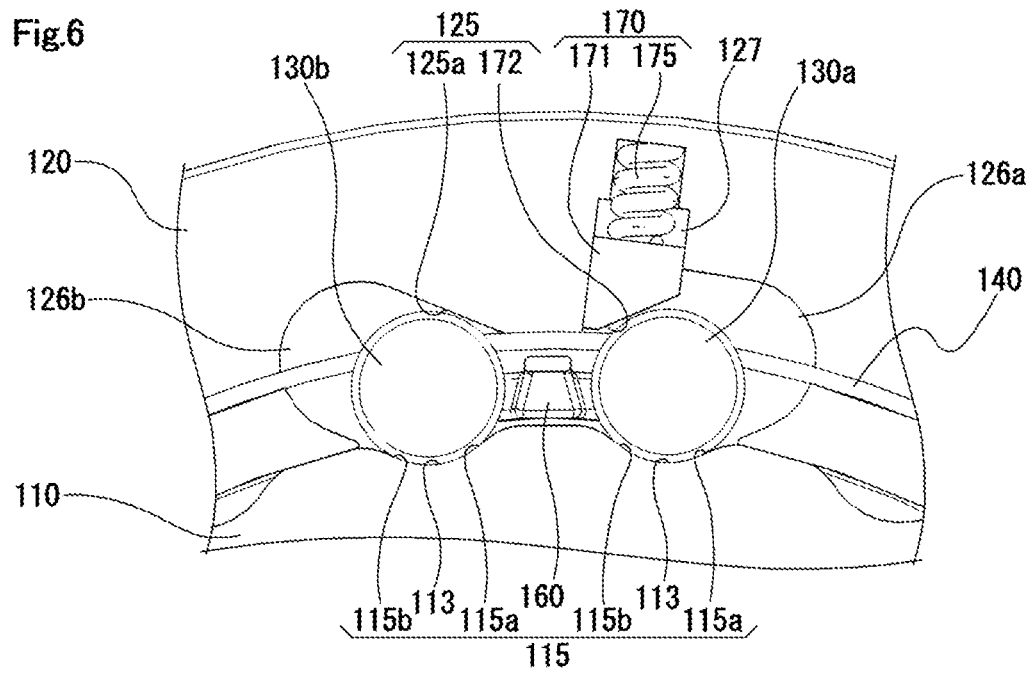
FIG. 6 is a front view illustrating a configuration of essential parts of the positive clutch shown in FIG. 1 with some parts being omitted.

On the outer circumferential surface of the inner race 110 are formed roller support parts 113 for supporting the lower surfaces of the rollers 130 at predetermined circumferential intervals as shown in FIG. 5 and FIG. 6.

In this embodiment, two rollers 130, each held in each of two adjacent roller support parts 113, make a pair. Six roller pairs 131 are arranged circumferentially at equal intervals. Hereinafter, for convenience of explanation, the clockwise direction in FIG. 5 shall be referred to as the forward direction, and the counterclockwise as the reverse direction. One roller 130 of the roller pairs 131 located on the side in the forward direction will be referred to as the first roller 130a, and another roller 130 of the roller pairs 131 located on the side in the reverse direction as the second roller 130b. Unless otherwise specified, the first roller 130a and second roller 130b will be referred to simply as roller(s) 130.

The number of roller pairs 131 is not limited to a particular number, and may be changed as required corresponding to a target torque capacity. The roller pairs 131 need not be equally spaced apart.

The roller support parts 113 are formed by recessed grooves extending in the direction of the rotation axis, with their groove width increasing from the bottom radially outwards.

The roller support part 113 includes a first slope portion 115a that is flat and inclined in the forward direction radially outwards, and a second slope portion 115b that is flat and inclined in the reverse direction radially outwards. The first slope portion 115a forms part of the inner race slope portion 115, which holds the first roller 130a together with the outer race slope portion 125 in the circumferential direction. The second slope portion 115b forms part of the inner race slope portion 115, which holds the second roller 130b together with the outer race slope portion 125 in the circumferential direction.

The opening edge of the roller support part 113 is chamfered, for example, as viewed in cross section, which can help facilitate the rolling of the rollers 130 and reduce the ratchet noise.

In the inner circumferential surface of the tubular part 124 of the outer race 120 are formed first pocket parts 126a corresponding to the first rollers 130a of the roller pairs 131, extending at an angle in the forward direction radially outwards. Second pocket parts 126b corresponding to the second rollers 130b of the roller pairs 131 extend at an angle in the reverse direction radially outwards.

The first pocket parts 126a and second pocket parts 126b are configured to be able to accommodate one roller 130 each inside to allow the rollers 130 to separate from the inner race 110.

The second pocket part 126b includes a third slope portion 125a on the radially outer side that is flat and extends at an angle in the reverse direction radially outwards. This third slope portion 125a forms part of the outer race slope portion 125 and holds the second roller 130b between itself and the second slope portion 115b of the roller support part 113 in the circumferential direction.

The biasing means 140 in this embodiment is a garter spring, for example. A mounting groove 135 extends circumferentially on the outer circumferential surface of each of the plurality of rollers 130, and the biasing means is mounted in these mounting grooves. Using a garter spring as the biasing means 140 eliminates the need to provide multiple biasing means corresponding to the plurality of rollers 130. This reduces the number of components and helps reduce the size of the clutch.

The switching member 150 in this embodiment is configured to be moved axially independently of the rotation of the inner race 110 and outer race 120, whereby one or both of the first rollers 130a and second rollers 130b are moved into the corresponding pocket parts against the biasing force of the biasing means 140, to switch the operating modes of the positive clutch 100.

Figure 7:
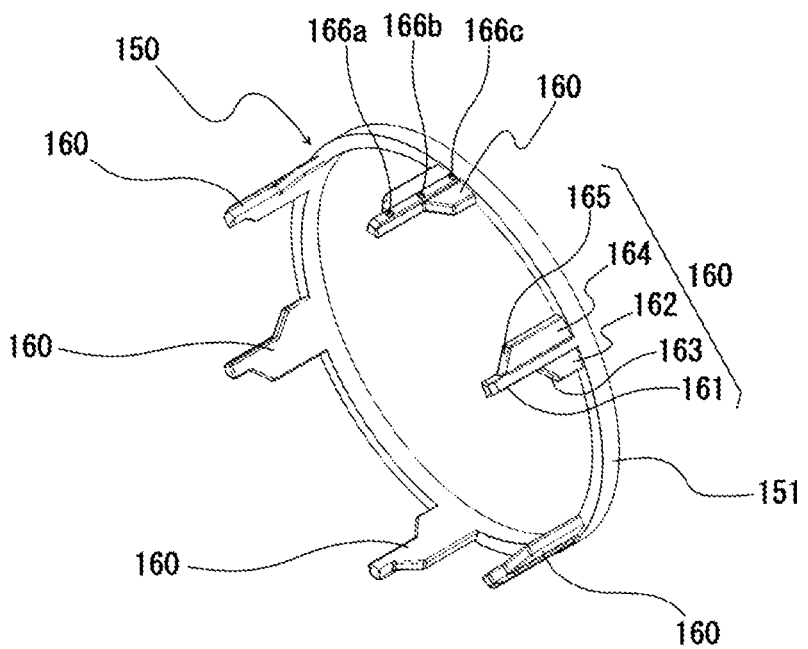
FIG. 7 is a perspective view illustrating the configuration of a switching member of the positive clutch shown in FIG. 1 as seen from the front side in the axial direction.

The switching member 150 includes a cylindrical base part 151, and a plurality of roller position changing parts 160 that axially extend from one end face of the base part 151, as shown in FIG. 7. Each of the roller position changing parts 160 corresponds to each of the plurality of roller pairs 131.

Each roller position changing part 160 has a pillar part 161, a first pressing part 162 on one side in the forward direction of the pillar part 161 to press the first roller 130a, and a second pressing part 164 on the side in the reverse direction of the pillar part 161 to press the second roller 130b.

The first pressing part 162 has a first taper 163 that increases in width toward the back side in the axial direction. The second pressing part 164 has a second taper 165 that increases in width toward the back side in the axial direction.

The first taper 163 is located further towards the rear in the axial direction than the second taper 165. With such tapers, it is possible to change the positions of either the second rollers 130b alone of the roller pairs 131, or both of the first rollers 130a and second rollers 130b, by tailoring the amount of axial movement of the switching member 150.

The pillar part 161 of one of the roller position changing parts 160 is formed with a first retention hole 166a, a second retention hole 166b, and a third retention hole 166c. The first retention hole 166a is used to fix the switching member 150 at a first fixed position to keep the switching member 150 in the non-operating state. The second retention hole 166b is used to fix the switching member 150 in a second fixing position to keep the second rollers 130b separated from the inner race 110. The third retention hole 166c is used to fix the switching member 150 in a third fixed position to keep the first rollers 130a and second rollers 130b separated from the inner race 110. The axial position of the switching member 150 can be fixed by inserting a position fixing pin (not shown) in one of the first retention hole 166a, second retention hole 166b, and third retention hole 166c.

Figure 2:
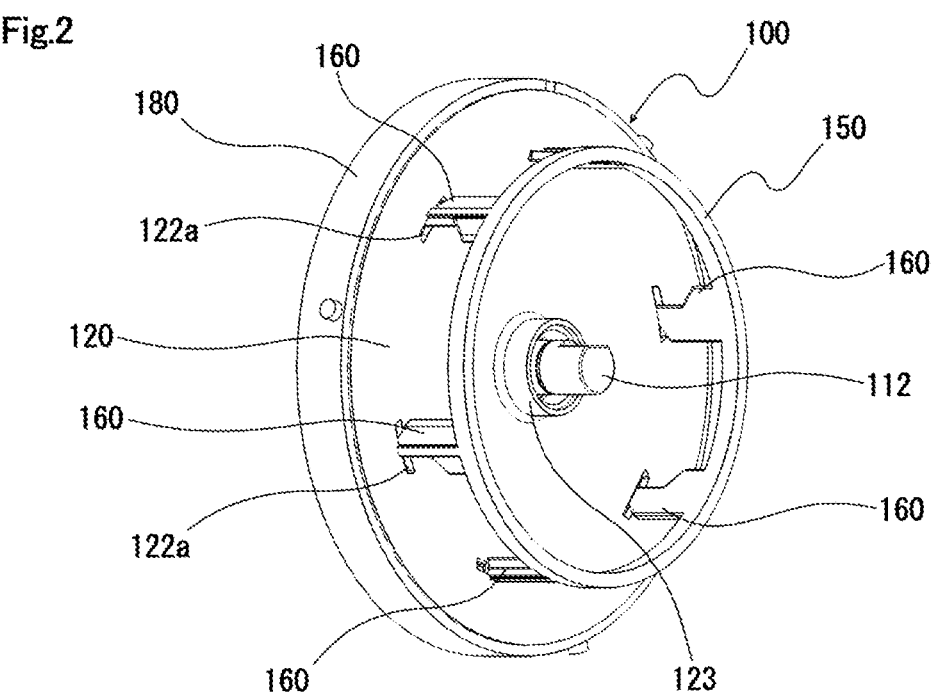
FIG. 2 is a perspective view of the positive clutch shown in FIG. 1 as seen from the back side in the axial direction.
Figure 3:
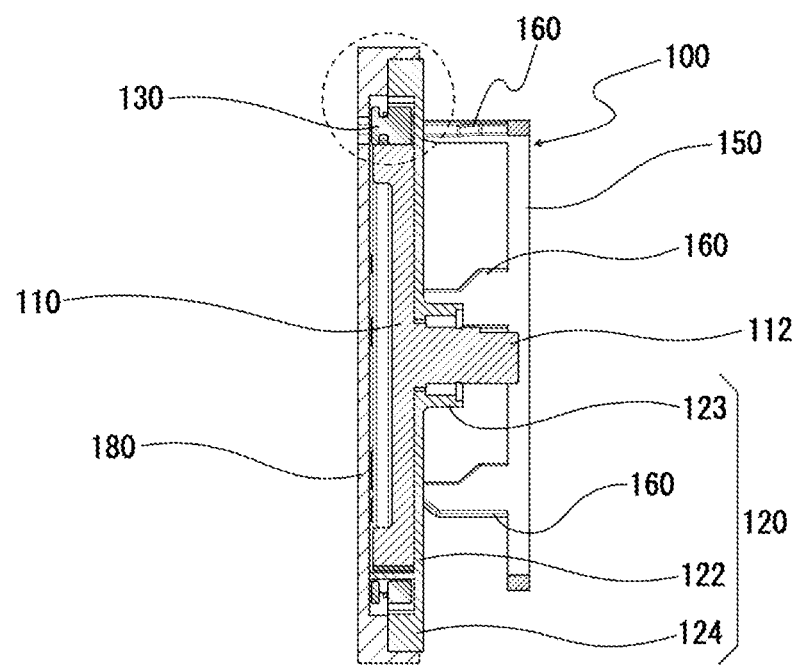
FIG. 3 is a cross-sectional view along the rotation axis of the positive clutch shown in FIG. 1.
Figure 4:
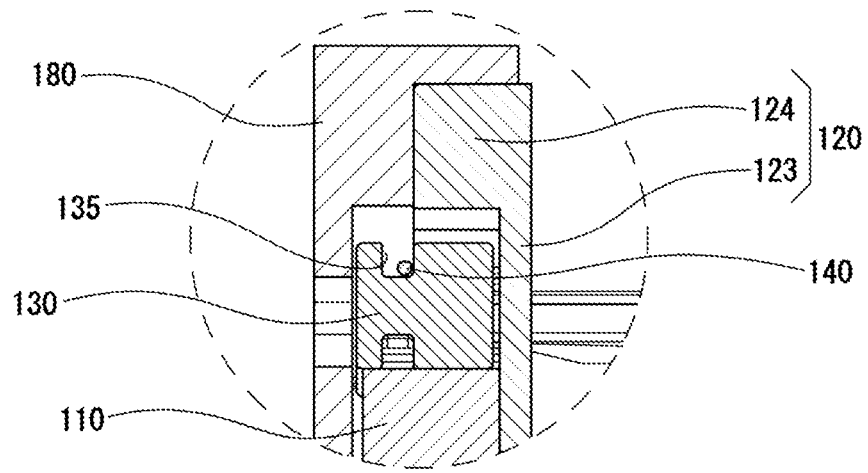
FIG. 4 is an enlarged cross-sectional view illustrating the area encircled by a broken line in FIG. 3.

As shown in FIG. 2, the bottom plate part 122 of the outer race 120 has through holes 122a, which allow the plurality of roller position changing parts 160 of the switching member 150 to pass through. Each roller position changing part 160 is positioned between the first roller 130a and the second roller 130b of each roller pair 131, on the side of the inner race 110 in the radial direction.

The cover member 180 also has through holes 181, which are aligned with the through holes 122a of the outer race 120 to allow the roller position changing parts 160 to pass through, as shown in FIG. 1.

The positive clutch 100 of this embodiment includes a forward torque limiter mechanism 170a that limits the amount of torque transmitted in the forward direction between the inner race 110 and the outer race 120 (hereinafter referred to simply as "torque limiter mechanism 170" unless otherwise specifically mentioned).

The torque limiter mechanism 170 includes a piston member 171 and a resilient member 175 that applies a constant load on the piston member 171 as shown in FIG. 6. The piston member 171 is a columnar body with an inclined surface 172 that is formed by cutting one end of the column in a plane inclined to the center axis, while the resilient member 175 is a coil spring, for example.

In this embodiment, the torque limiter mechanism 170 is provided to the first roller 130a in each of the plurality of roller pairs 131 and located on one side in the reverse direction of the first rollers 130a. Piston member accommodating holes 127 are formed in the wall surface on the radially outer side of the first pocket parts 126a of the outer race 120, in which the piston members 171 are slidably accommodated. The resilient member 175 is accommodated with its coil axis oriented along the radial direction. The piston member 171 is oriented such that its inclined surface 172 faces the forward direction. The inclined surface 172 of the piston member 171 forms part of the outer race slope portion 125 and holds the first roller 130a between itself and the first slope portion 115a of the roller support part 113 in the circumferential direction.

In the positive clutch 100 of this embodiment, the inclined surface 172 of the piston member 171 is formed to extend parallel to the first slope portion 115a of the roller support part 113 for the first roller 130a.

Figure 8:
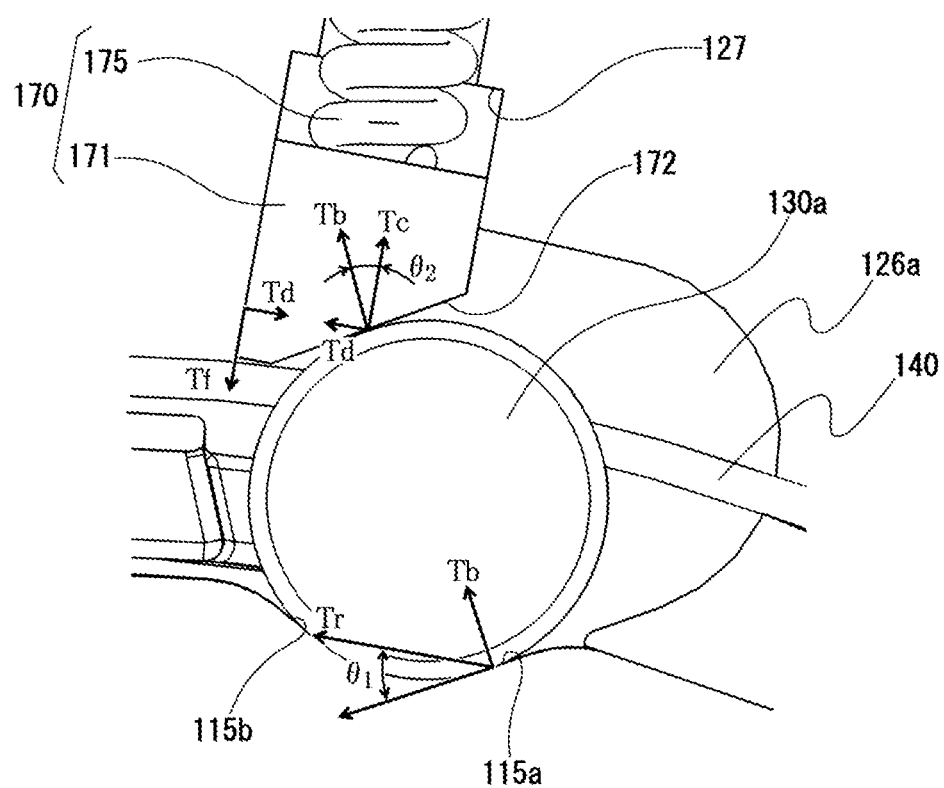
FIG. 8 is a vector diagram for explaining the action of the torque limiter mechanism.

As shown in FIG. 8, the first roller 130a receives a normal force of Tb (=Tr·sin $\theta_1$) [N] from the first slope portion 115a of the roller support part 113 of the inner race, where Tr [N] is the load acting on the first roller 130a. Angle $\theta_1$ represents the inclination angle [°] of the first slope portion 115a.

Since the inclined surface 172 and the first slope portion 115a are parallel, the piston member 171 receives a pressure load of Tb from the first roller 130a in the direction perpendicular to the inclined surface 172. A normal force of Tc (=Tb·cos $\theta_2$) [N] acts on the spring surface in the direction of the coil axis of the resilient member 175. A normal force of Td (=Tb·sin $\theta_2$) [N] acts on the sliding surfaces of the piston member 171 and the piston member accommodating hole 127 in the perpendicular direction. Angle $\theta_2$ represents the inclination angle [°] of the inclined surface 172 of the piston member 171.

When the normal force on the spring surface Tc is greater than the sum of the spring load N and the friction force on the sliding surfaces Tf (=μTd) [N], where N [N] is the spring load of the coil spring that is the resilient member 175, i.e., the load applied to the piston member 171, and μ is the coefficient of friction on the sliding surfaces, the piston member 171 moves to compress the resilient member 175, to limit the amount of torque transmitted between the inner race 110 and the outer race 120.

The inclined surface 172 of the piston member 171 need not be parallel to the first slope portion 115a. A configuration where the inclined surface 172 of the piston member 171 and the first slope portion 115a are at different angles is also possible.

Figure 9:
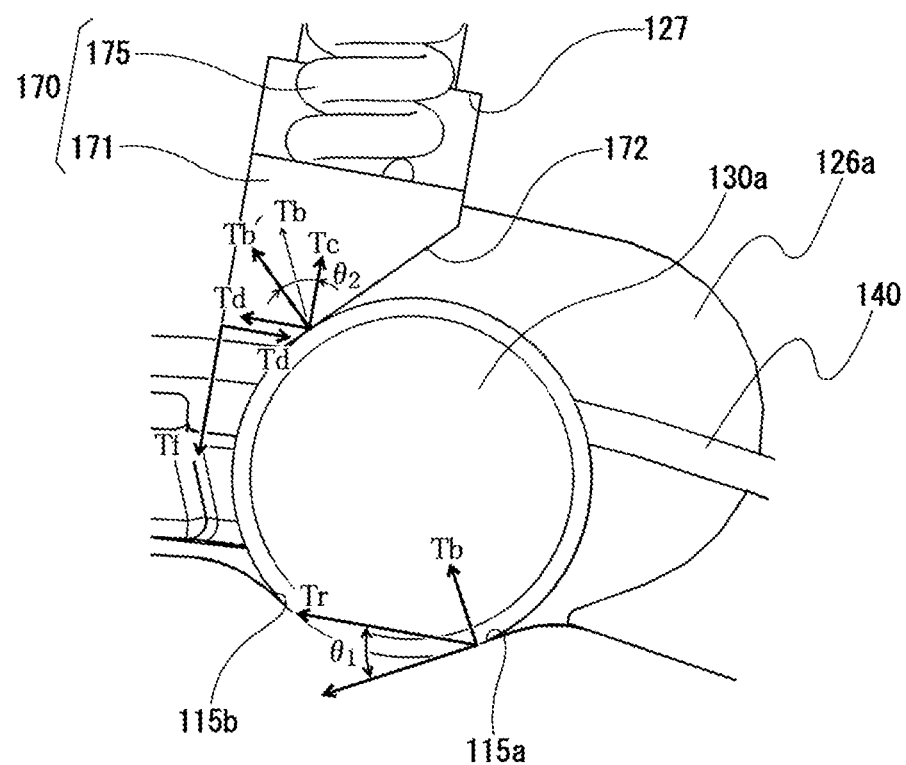
FIG. 9 is a vector diagram for explaining the action of the torque limiter mechanism in which there is an angle difference between an inclined surface of a piston member and an inner race slope portion.

As shown in FIG. 9, the normal force Tb' on the sliding surfaces increases when the inclination angle $\theta_2$ [°] of the inclined surface 172 of the piston member 171 is made greater than the inclination angle $\theta_1$ [°] of the first slope portion 115a. Therefore, the torque limit load carried by the friction force Tf on the sliding surfaces increases, while the torque limit load carried by the resilient force of the resilient member 175 decreases.

On the other hand, the normal force on the sliding surfaces decreases when the inclination angle $\theta_2$ [°] of the inclined surface 172 of the piston member 171 is made smaller than the inclination angle $\theta_1$ [°] of the first slope portion 115a. Therefore, the torque limit load carried by the resilient force of the resilient member 175 increases, while the torque limit load carried by the friction force Tf on the sliding surfaces decreases.

There may be provided an angle difference between the inclined surface 172 of the piston member 171 and the first slope portion 115a as described above to tailor the amount of friction force on the sliding surfaces of the piston member 171 and the piston member accommodating hole 127. The proportion of the torque limit load carried by the friction force on the sliding surfaces of the piston member 171 and the piston member accommodating hole 127, and the torque limit load carried by the resilient force of the resilient member 175, can be changed by this adjustment of friction force, which facilitates an attempt to improve performance stability.

The operation of the above positive clutch 100 is described below.

The positive clutch 100 according to this embodiment can switch between three operating modes: a two-way lock mode that prohibits relative rotation between the inner race 110 and the outer race 120 in both forward and reverse directions; a forward lock mode that prohibits relative rotation between the inner race 110 and the outer race 120 in the forward direction; and a two-way free mode that allows relative rotation between the inner race 110 and the outer race 120 in both forward and reverse directions.

Figure 10:
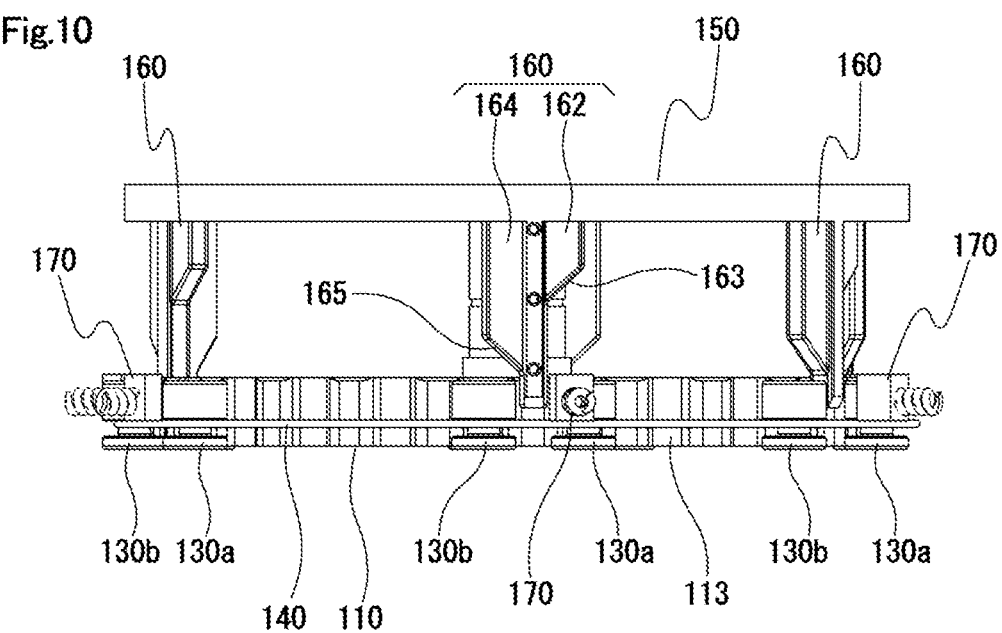
FIG. 10 is a plan view illustrating a state of the positive clutch shown in FIG. 1, when the operating mode is a two-way lock mode, with some parts being omitted.
Figure 11A:
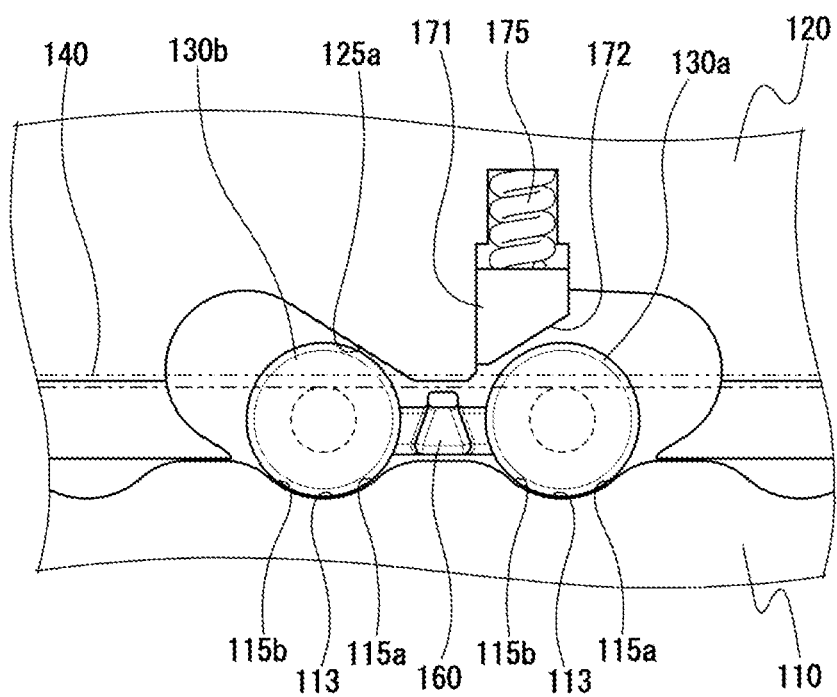
FIG. 11A is a schematic diagram illustrating a standby state of the positive clutch shown in FIG. 1 when the operating mode is the two-way lock mode.

First, when the switching member 150 is fixed in the first fixed position and in the non-operating state, as shown in FIG. 10, the first rollers 130a and second rollers 130b are maintained in the standby state where they can immediately start engaging with the inner race 110 and outer race 120 upon application of torque on either the inner race 110 or the outer race 120 as shown in FIG. 11A. The operating mode of the positive clutch 100 is therefore the two-way lock mode.

Figure 11B:
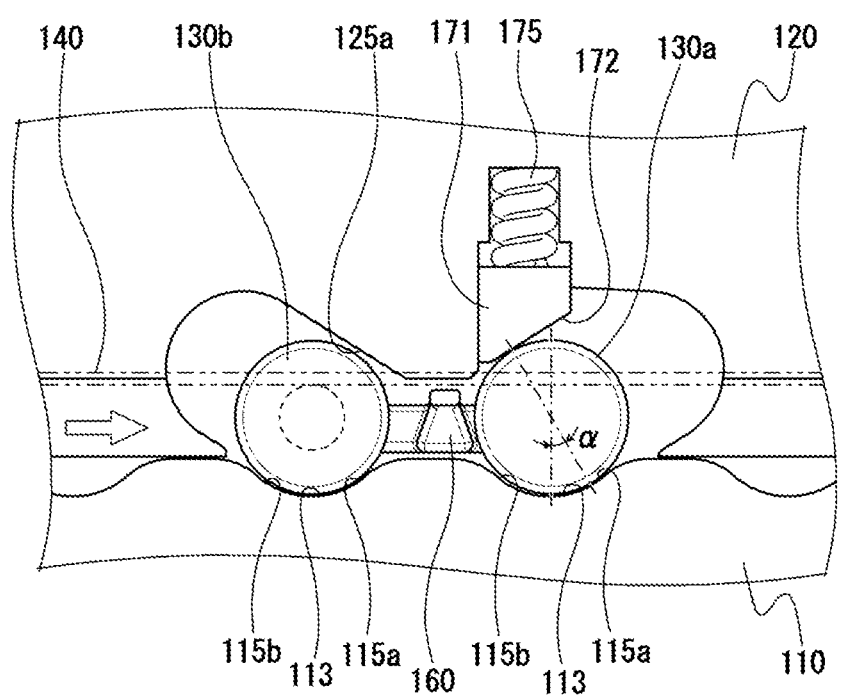
FIG. 11B is a diagram illustrating a state of the positive clutch shown in FIG. 1 in the two-way lock mode when the outer race is rotated in the forward direction.

When the outer race 120 is rotated in the forward direction, for example, the first roller 130a is held between the first slope portion 115a of the roller support part 113 that supports the first roller 130a, and the inclined surface 172 of the piston member 171, in the circumferential direction as shown in FIG. 11B. Thus the inner race 110 engages with the outer race 120. The second rollers 130b are kept standby.

The contact angle α of the first roller 130a is defined as an angle of a line connecting the respective contact points of the first slope portion 115a and the inclined surface 172 of the piston member 171 with the first roller 130a relative to the radial direction (which extends along a line connecting the rotation axis of the positive clutch 100 and the center of the first roller 130a). The first roller 130a is held between the first slope portion 115a and the inclined surface 172 of the piston member 171 in the circumferential direction, with the contact angle α being smaller than 90°. A contact angle α closer to 90° causes a smaller normal component of the input load to be generated, which allows for reliable backstop (reverse rotation prevention). With the contact angle α closer to 0°, the step on the inner race 110 will be smaller, which provides lower rolling resistance for the roller 130 in the one-way lock mode.

A preset torque is determined by the friction force on the sliding surfaces of the piston member 171 and the piston member accommodating hole 127, and the spring load of the resilient member 175. In the event of torque input exceeding the preset torque, the piston member 171 moves to compress the resilient member 175 as shown in FIG. 11C, to limit the amount of torque transmitted between the inner race 110 and the outer race 120. When the piston member 171 has moved to a limit point, the first roller 130a is pressed by the inclined surface 172 in the forward direction and rolls onto the outer circumferential surface of the inner race 110 as shown in FIG. 11D. Thus the inner race 110 is disengaged from the outer race 120 and the torque is released.

The second roller 130b rolls onto the outer circumferential surface of the inner race 110 and moves toward the second pocket part 126b.

Figure 11E:
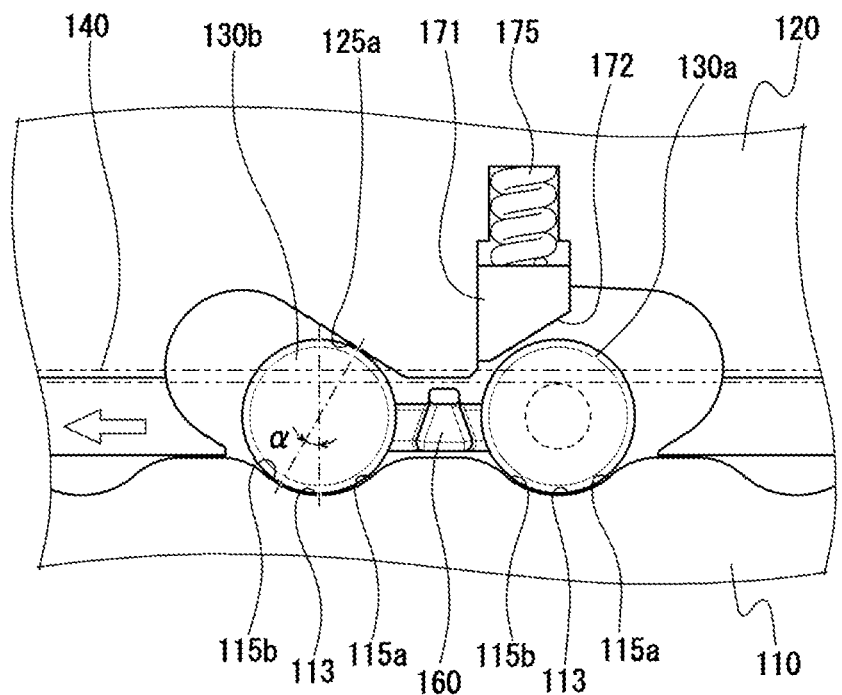
FIG. 11E is a diagram illustrating a state of the positive clutch shown in FIG. 1 in the two-way lock mode when the outer race is rotated in the reverse direction.

On the other hand, when the outer race 120 is rotated in the reverse direction, the second roller 130b is held between the second slope portion 115b of the roller support part 113 that supports the second roller 130b, and the third slope portion 125a, in the circumferential direction as shown in FIG. 11E. Thus the inner race 110 engages with the outer race 120. The first rollers 130a are kept standby.

The second roller 130b is held between the second slope portion 115b and the third slope portion 125a in the circumferential direction with the contact angle α being smaller than 90°.

In this positive clutch 100, the operating mode of the positive clutch 100 can be switched from the two-way lock mode to the one-way lock mode by holding one of the rollers 130 of each roller pair 131 separated from the inner race 110.

Figure 12:
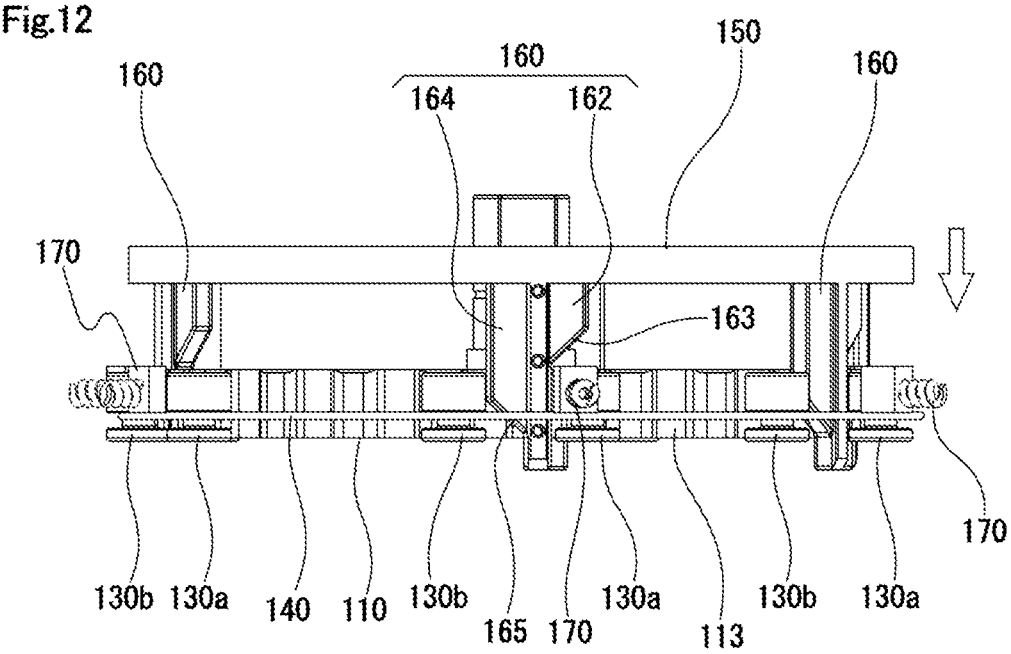
FIG. 12 is a plan view illustrating a state of the positive clutch shown in FIG. 1, when the operating mode is a forward lock mode, with some parts being omitted.

Namely, in the positive clutch 100 according to this embodiment, when the switching member 150 is moved to the front side in the axial direction as shown in FIG. 12, and fixed in the second fixed position, only the second roller 130b of each roller pair 131 is moved into the second pocket part 126b by the action of the second taper 165 of the roller position changing part 160 against the biasing force of the biasing means 140 as shown in FIG. 13A. The second rollers 130b are thus held in the position separated from the inner race 110, i.e., the operating mode is switched to the forward lock mode.

Although not shown, the first taper 163 on the switching member 150 may be formed at a position on the front side in the axial direction relative to the second taper 165, for example. It is then possible to hold only the first roller 130a of each roller pair 131 separated from the inner race 110 by fixing the switching member 150 in the second fixed position, i.e., the operating mode can be switched to the reverse lock mode.

When the operating mode of the positive clutch 100 is the forward lock mode, rotating the outer race 120 in the forward direction, for example, causes each first roller 130a to be held between the first slope portion 115a of the roller support part 113 that supports the first roller 130a, and the inclined surface 172 of the piston member 171, in the circumferential direction. Thus the inner race 110 engages with the outer race 120 and torque is transmitted. In the event of a torque exceeding the preset torque input in the forward direction as mentioned above, the torque limiter mechanism 170 acts to release the torque, and limits the amount of torque transmitted between the inner race 110 and the outer race 120.

Rotating the outer race 120 in the reverse direction causes the first rollers 130a to roll onto the outer circumferential surface of the inner race 110 as shown in FIG. 13B and move toward the first pocket parts 126a so that the outer race 120 freewheels.

In this positive clutch 100, the operating mode of the positive clutch 100 can be switched to the two-way free mode by holding the first rollers 130a and second rollers 130b separated from the inner race 110.

Figure 14:
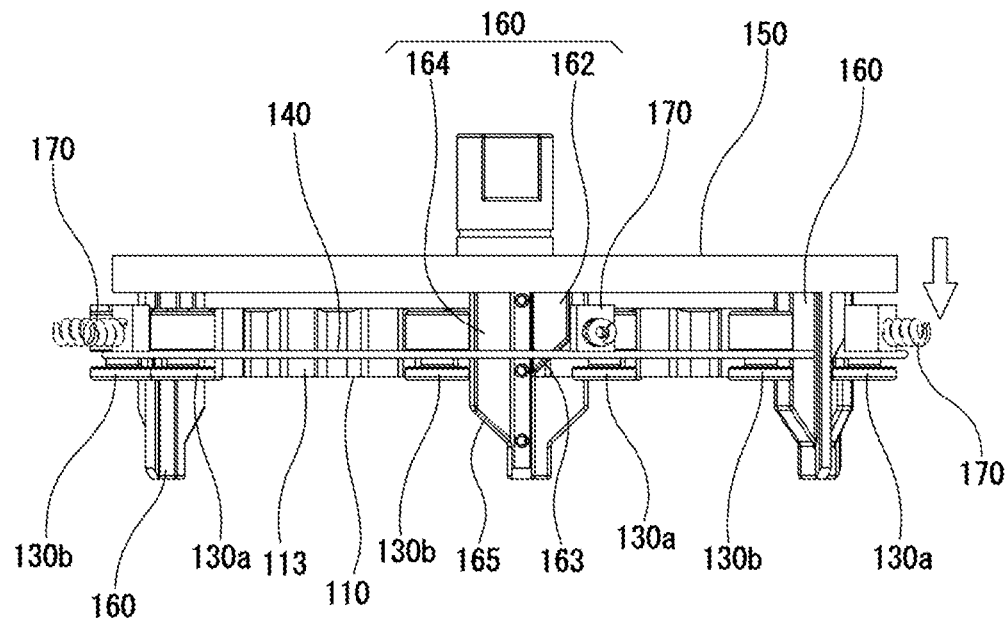
FIG. 14 is a plan view illustrating a state of the positive clutch shown in FIG. 1, when the operating mode is a two-way free mode, with some parts being omitted.
Figure 15:
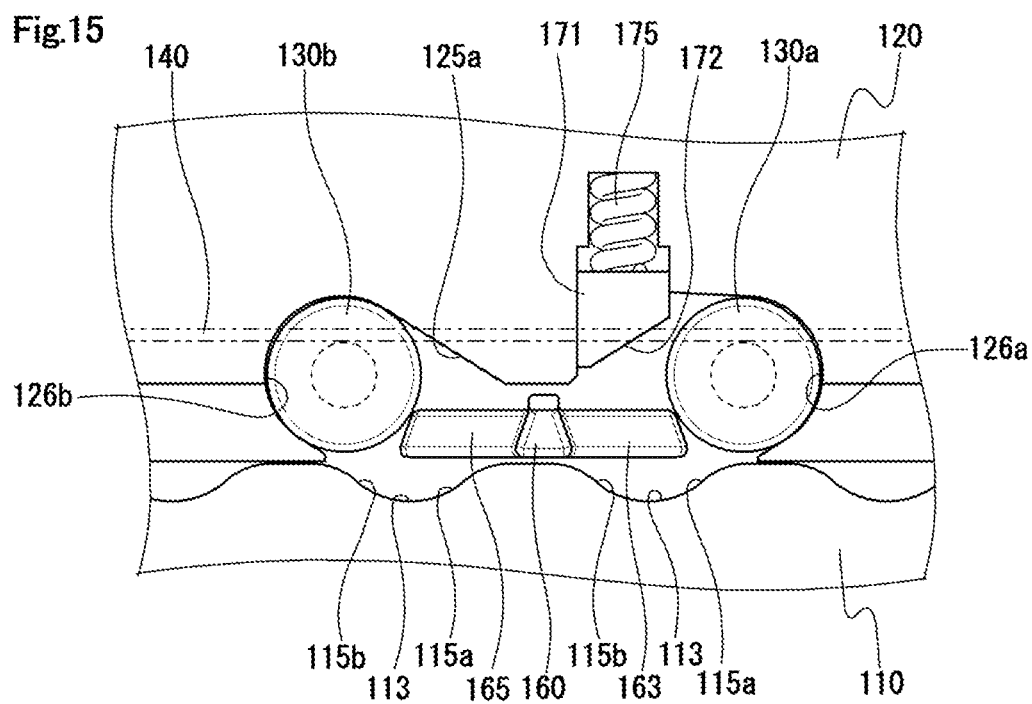
FIG. 15 is a schematic diagram illustrating a state of the positive clutch shown in FIG. 1 when the operating mode is the two-way free mode.

Namely, in the positive clutch 100 according to this embodiment, when the switching member 150 is axially moved to the front side and fixed in the third fixed position as shown in FIG. 14, the second roller 130b is moved into the second pocket part 126b by the action of the second taper 165 of the roller position changing part 160 against the biasing force of the biasing means 140, and the first roller 130a is moved into the first pocket part 126a by the action of the first taper 163 of the roller position changing part 160 against the biasing force of the biasing means 140, as shown in FIG. 15. Both of the first rollers 130a and second rollers 130b are thus held in a position separated from the inner race 110.

In this state, the outer race 120 freewheels when rotated, whether in the forward direction or in the reverse direction.

The positive clutch 100 described above achieves torque transmission between the inner race 110 and the outer race 120 by holding each first roller 130a between the first slope portion 115a of the roller support part 113 that supports the first roller 130a and the inclined surface 172 of the piston member 171 in the circumferential direction, or, by holding each second roller 130b between the second slope portion 115b of the roller support part 113 that supports the second roller 130b and the third slope portion 125a in the circumferential direction. As a result, no windup or torsional deflection occurs when torque is transmitted, which allows the positive clutch 100 to be designed as a high-rigidity clutch. The simple structure that achieves stable engagement allows for size reduction and the placement of a large number of rollers 130 in a small space. This enables the transmission of high torque. Moreover, the surface pressure applied to the slope portions and rollers 130 during torque transmission can be set low, allowing the clutch to be designed with an inexpensive material that is more resistant to chipping, which may be caused by impact, or wear. Since the rollers 130 rotate themselves and substantially do not engage at the same point, the durability of the clutch can be improved and its service life can be extended.

Moreover, the rollers 130 that are engaging elements in the clutch mechanism are used as the components for moving the piston members 171 of the torque limiter mechanisms 170, which reduces the number of components and enables a cost reduction, as well as facilitates size reduction and structural simplification. Further, the torque limiter mechanism 170 being a piston type that uses the resilient member 175 allows setting of the torque limit load based on the friction force on the sliding surfaces of the piston member 171 and the piston member accommodating hole 127, and on the resilient force of the resilient member 175. This enables easy adjustment of the torque limit load relatively more independently of friction coefficients, and helps reduce wear on the sliding surfaces, contributing to increased durability.

Furthermore, the operating modes of the positive clutch 100 can be easily switched by simply moving the switching member 150 in the axial direction to cause one or both of the first rollers 130a and second rollers 130b to be separated from the inner race 110. In the free mode in which the inner race 110 and outer race 120 are allowed to rotate relative to each other, all of the plurality of rollers 130 are separated from the inner race 110, which helps reduce friction loss and noise.

Second Embodiment

In the first embodiment, one configuration was described in which the torque transmitted in the forward direction is limited. Alternatively, the torque limiter mechanism may be provided to the second rollers, i.e., on the side in the forward direction of the second rollers, to limit the torque transmitted in the reverse direction, or may also be configured to limit the torque in both forward and reverse directions.

Figure 16:
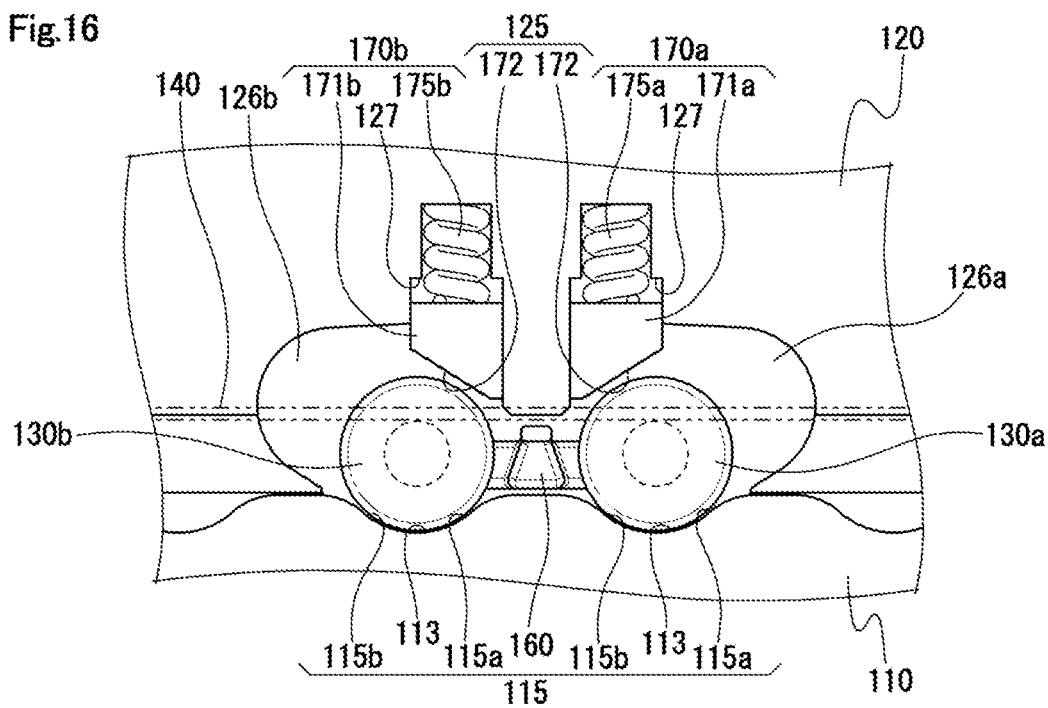
FIG. 16 is a schematic diagram illustrating the configuration of essential parts in one example of a positive clutch according to a second embodiment of the present invention.

FIG. 16 is a plan view illustrating the configuration of essential parts in one example a positive clutch according to a second embodiment of the present invention with some parts being omitted.

This positive clutch is a variation of the positive clutch 100 according to the first embodiment in which the forward torque limiter mechanism 170a that limits the torque transmitted in the forward direction is provided on the side in the reverse direction of each first roller 130a of each of the plurality of roller pairs 131. In addition, a reverse torque limiter mechanism 170b that limits the torque transmitted in the reverse direction is provided on the side in the forward direction of each second roller 130b. The positive clutch is otherwise configured the same as the positive clutch 100 according to the first embodiment described above.

With the torque limiter mechanism being provided to both of the first roller 130a and second roller 130b, the torque limit load is made changeable in both forward and reverse directions, which facilitates an attempt to improve performance stability.

The forward torque limiter mechanism 170a has a first piston member 171a slidably accommodated in a piston member accommodating hole 127 formed in the wall surface on the radially outer side of the first pocket part 126a of the outer race 120. A first resilient member 175a is accommodated with its coil axis oriented along the radial direction. The first piston member 171a is oriented such that its inclined surface 172 faces the forward direction. The inclined surface 172 of the first piston member 171a forms part of the outer race slope portion 125 and holds the first roller 130a between itself and the first slope portion 115a of the roller support part 113 in the circumferential direction.

The reverse torque limiter mechanism 170b has a second piston member 171b slidably accommodated in a piston member accommodating hole 127 formed in the wall surface on the radially outer side of the second pocket part 126b of the outer race 120. A second resilient member 175b is accommodated with its coil axis oriented along the radial direction. The second piston member 171b is oriented such that its inclined surface 172 faces the reverse direction. The inclined surface 172 of the second piston member 171b forms part of the outer race slope portion 125 and holds the second roller 130b between itself and the second slope portion 115b of the roller support part 113 in the circumferential direction.

The inclined surfaces 172 of the first piston member 171a of the forward torque limiter mechanism 170a and the second piston member 171b of the reverse torque limiter mechanism 170b may be inclined at the same angle, or different angles.

The first resilient member 175a of the forward torque limiter mechanism 170a and the second resilient member 175b of the reverse torque limiter mechanism 170b may have the same spring load, or different spring loads.

In the positive clutch according to the second embodiment, when the operating mode is the two-way lock mode or the forward lock mode, rotating the outer race 120 in the forward direction, for example, causes each first roller 130*a* to be held between the first slope portion 115*a* of the roller support part 113 that supports the first roller 130*a*, and the inclined surface 172 of the first piston member 171*a*, in the circumferential direction. Thus the inner race 110 engages with the outer race 120 and torque is transmitted. In the event of a torque exceeding the preset torque input in the forward direction as mentioned above, the forward torque limiter mechanism 170*a* acts to release the torque, and limits the amount of torque transmitted between the inner race 110 and the outer race 120.

On the other hand, when the operating mode of the positive clutch is the two-way lock mode or the reverse lock mode, rotating the outer race 120 in the reverse direction, for example, causes each second roller 130*b* to be held between the second slope portion 115*b* of the roller support part 113 that supports the second roller 130*b*, and the inclined surface 172 of the second piston member 171*b*, in the circumferential direction. Thus the inner race 110 engages with the outer race 120 and torque is transmitted. In the event of a torque exceeding the preset torque input in the reverse direction as mentioned above, the reverse torque limiter mechanism 170*b* acts to release the torque, and limits the amount of torque transmitted between the inner race 110 and the outer race 120.

When the operating mode of the positive clutch is the two-way free mode, the outer race 120 freewheels when rotated, whether in the forward direction or in the reverse direction.

Figure 17:
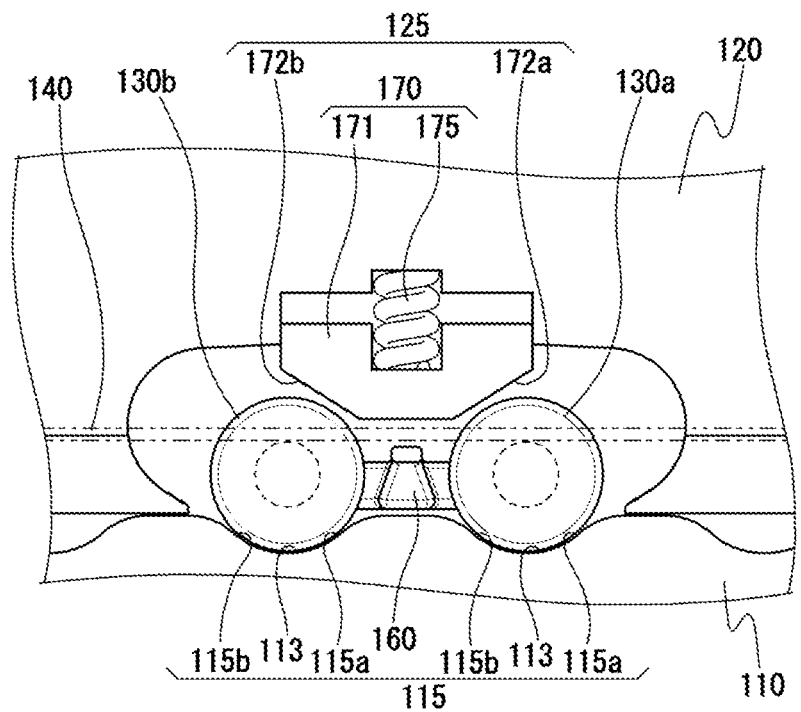
FIG. 17 is a schematic diagram illustrating the configuration of essential parts in another example of the positive clutch according to the second embodiment of the present invention.

In the positive clutch according to this embodiment, the forward torque limiter mechanism 170*a* and reverse torque limiter mechanism 170*b* are configured independently of each other. Instead, the forward torque limiter mechanism and reverse torque limiter mechanism may be configured to share the piston member 171 and resilient member 175, for example, as shown in FIG. 17.

The piston member 171 in this example has a first inclined surface 172*a* that is flat and inclined in the forward direction radially outwards, and a second inclined surface 172*b* that is flat and inclined in the reverse direction radially outwards. The first inclined surface 172*a* forms part of the outer race slope portion 125 and holds the first roller 130*a* between itself and the first slope portion 115*a* of the roller support part 113 in the circumferential direction. The second inclined surface 172*b* forms part of the outer race slope portion 125 and holds the second roller 130*b* between itself and the second slope portion 115*b* of the roller support part 113 in the circumferential direction.

The torque limit load of a positive clutch with such a configuration is also changeable in both forward and reverse directions by suitably changing the inclination angle of the first inclined surface 172*a* and second inclined surface 172*b*, for facilitating an attempt to improve performance stability.

In the first and second embodiments described above, the rollers 130 are separated from the inner race 110 by axially moving the switching member 150 independently of the rotation of the inner race 110 and outer race 120, when switching the operating modes of the positive clutch 100. The switching member is not limited to the configuration described above, as long as it is configured to be able to separate the rollers 130 from the inner race 110 or the outer race 120 by causing the rollers 130 to move into the pocket parts against the biasing force of the biasing means 140.

Third Embodiment

Figure 18:
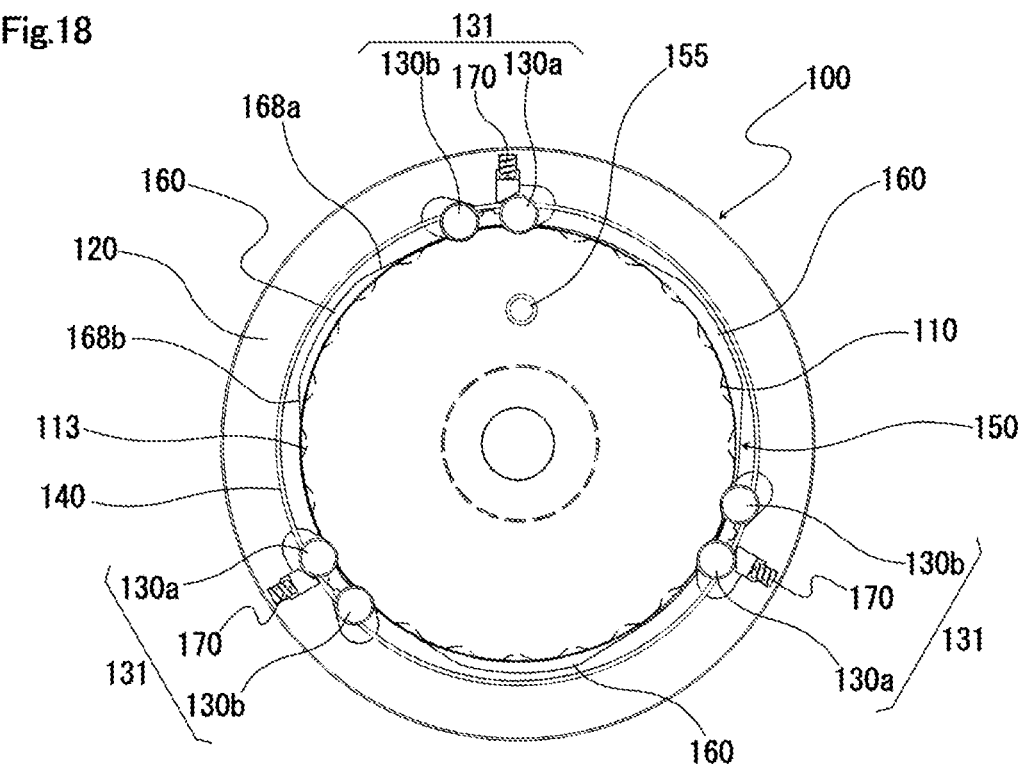
FIG. 18 is a front view illustrating one configuration example of a positive clutch according to a third embodiment of the present invention with some parts being omitted.
Figure 19:
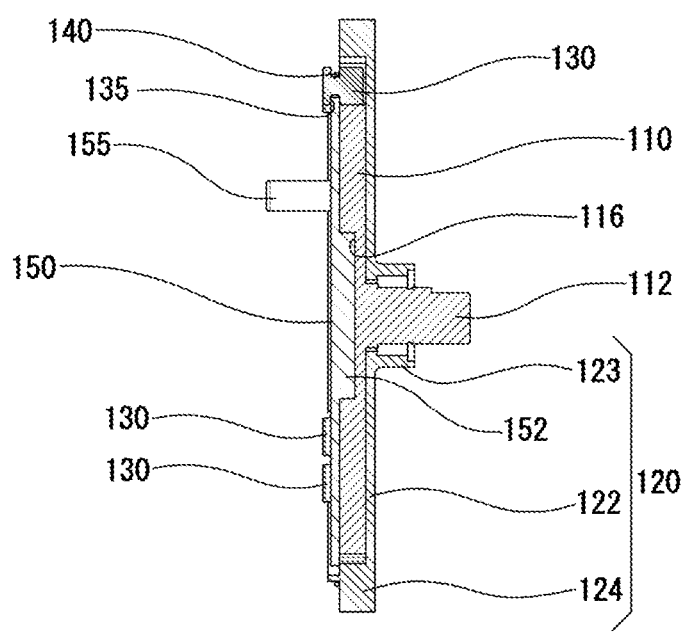
FIG. 19 is a cross-sectional view of a plane containing the rotation axis of the positive clutch shown in FIG. 18.

FIG. 18 is a front view illustrating one configuration example of a positive clutch according to a third embodiment of the present invention, with some parts being omitted. FIG. 19 is a cross-sectional view along the plane containing the rotation axis of the positive clutch shown in FIG. 18.

This positive clutch 100 has the same configuration as that of the positive clutch 100 of the first embodiment except for the switching member 150.

The switching member 150 is configured to be rotated independently of the rotation of the inner race 110 and outer race 120 such as to cause the rollers 130 to separate from the inner race 110.

The switching member 150 is composed of a plate member that can rotate independently of the inner race 110 and outer race 120, for example, and includes an outwardly protruding columnar protrusion 152 in the center on the back side. Reference numeral 155 denotes a rod-like operating part that is an integral part of the switching member 150 and extends in the direction of the rotation axis.

The switching member 150 has an outer peripheral edge that is slidably held in respective mounting grooves 135 of the plurality of rollers 130. The columnar protrusion 152 is rotatably set in a recess 116 formed on the front side of the inner race 110.

The switching member 150 has a plurality of roller position changing parts 160, each part corresponding to each of the plurality of roller pairs 131. The roller position changing part 160 is configured to move one or both of the first roller 130*a* and second roller 130*b* between the roller support part(s) 113 and the corresponding pocket part(s). Each roller position changing part includes a first cam surface 168*a* that gradually increases in outside diameter as the switching member 150 rotates in the forward direction, and a second cam surface 168*b* that gradually decreases in outside diameter as the switching member 150 rotates in the forward direction.

In the positive clutch 100 according to this embodiment, when the switching member 150 is fixed in the first fixed position and in the non-operating state as shown in FIG. 20A, the first rollers 130*a* and second rollers 130*b* are maintained in the standby state where they can immediately start engaging with the inner race 110 and outer race 120 upon application of torque on either the inner race 110 or the outer race 120. The operating mode of the positive clutch 100 in this state is therefore the two-way lock mode.

When the switching member 150 is rotated in the forward direction for example, as shown in FIG. 20B, and fixed in the second fixed position, only the second rollers 130*b* of the roller pairs are moved into the second pocket parts 126*b* by the action of the first cam surface 168*a* of the roller position changing parts 160 against the biasing force of the biasing means 140. The second rollers 130*b* are thus held in the position separated from the inner race 110, i.e., the operating mode of the positive clutch 100 is switched to the forward lock mode. Although not shown, the operating mode of the positive clutch 100 may be switched to the reverse lock mode by rotating the switching member 150 to hold only the first rollers 130*a* of the roller pairs 131 separated from the inner race 110.

Further, when the switching member 150 is rotated in the forward direction and fixed in the third fixed position, as shown in FIG. 20C, both of the first rollers 130*a* and the second rollers 130*b* are moved into their respective pocket parts by the action of the first cam surface 168*a* of the roller position changing parts 160 against the biasing force of the biasing means 140. The first rollers 130*a* and second rollers 130*b* are thus both held in the position separated from the inner race 110, i.e., the operating mode of the positive clutch 100 is switched to the two-way free mode.

In the positive clutch 100 according to the third embodiment, when the operating mode is the two-way lock mode or the forward lock mode, rotating the outer race 120 in the forward direction, for example, causes each first roller 130*a* to be held between the first slope portion 115*a* of the roller support part 113 that supports the first roller 130*a*, and the inclined surface 172 of the piston member 171, in the circumferential direction. Thus the inner race 110 engages with the outer race 120 and torque is transmitted. In the event of a torque exceeding the preset torque input in the forward direction as mentioned above, the torque limiter mechanism 170 acts to release the torque, and limits the amount of torque transmitted between the inner race 110 and the outer race 120.

On the other hand, when the operating mode of the positive clutch 100 is the two-way lock mode or the reverse lock mode, rotating the outer race 120 in the reverse direction, for example, causes each second roller 130*b* to be held between the second slope portion 115*b* of the roller support part 113 that supports the second roller 130*b*, and the third slope portion 125*a*, in the circumferential direction. Thus the inner race 110 engages with the outer race 120 and torque is transmitted.

When the operating mode of the positive clutch 100 is the two-way free mode, the outer race 120 freewheels when rotated, whether in the forward direction or in the reverse direction.

In the above positive clutch 100 according to the third embodiment, similarly to the positive clutch according to the second embodiment, the forward torque limiter mechanism may be provided on the side in the reverse direction of each first roller 130*a*, and the reverse torque limiter mechanism may be provided on the side in the forward direction of each second roller 130*b*, so that the positive clutch is configured to limit the torque in both forward and reverse directions.

In the first to third embodiments described above, the plurality of roller pairs 131 are located at the positions matching those of the roller support parts 113 so that all the rollers 130 are supported by the roller support parts 113 of the inner race 110 at the same time. Alternatively, the plurality of roller pairs 131 may include a roller pair 131 circumferentially displaced from the roller support part 113 as shown in FIG. 21. This example shows another form of the positive clutch 100 according to the third embodiment in which the plurality of roller pairs 131 are circumferentially displaced by half a pitch from the roller support parts 113. This arrangement can help reduce backlash and allow for smooth engagement between the inner race and outer race.

In the configuration of the torque limiter mechanism 170 according to the first to third embodiments described above, the piston member 171 is columnar. The configuration of the torque limiter mechanism is not limited to those described in the first to third embodiments.

Figure 22:
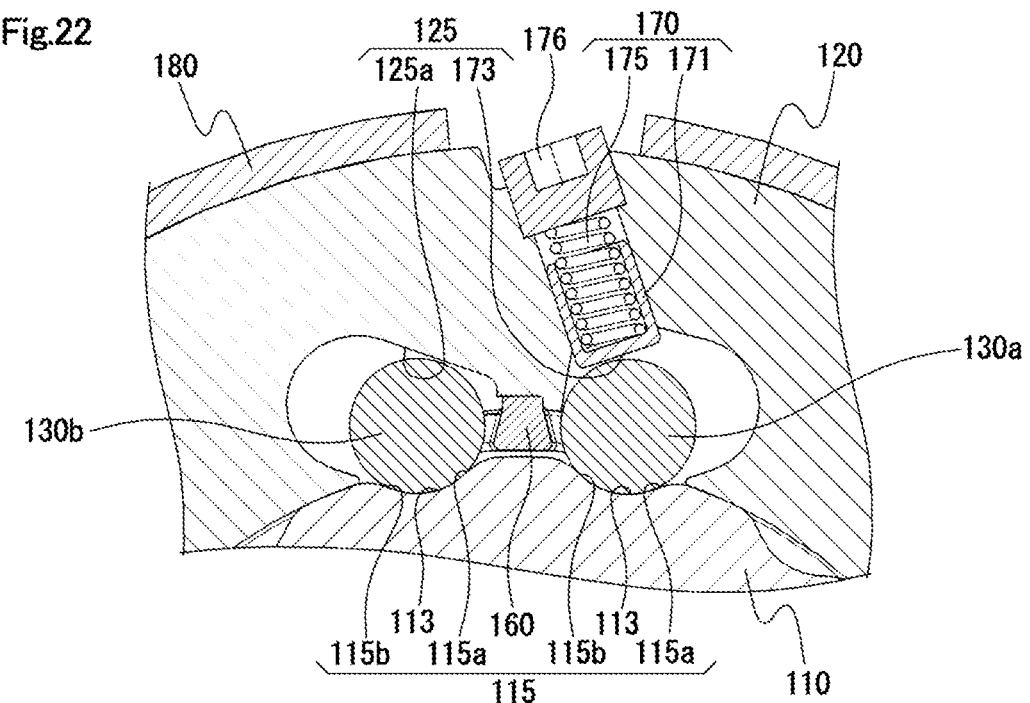
FIG. 22 is a cross-sectional view of a plane perpendicular to the rotation axis illustrating the configuration of essential parts in another example of the positive clutch according to the first embodiment of the present invention.

For example, as shown in FIG. 22, the piston member 171 in the torque limiter mechanism 170 may be in the form of a cylinder with a bottom, with a coil spring as the resilient member 175 being accommodated inside the piston member 171. This example shows another form of the positive clutch 100 according to the first embodiment in which the piston member 171 is oriented with its flat outer bottom wall 173 facing the forward direction. This outer bottom wall 173 forms part of the outer race slope portion 125 and holds the first roller 130*a* between itself and the first slope portion 115*a* of the roller support part 113 in the circumferential direction. Reference numeral 176 in FIG. 22 denotes a fixing member for anchoring the piston member 171 and resilient member 175 at a predetermined position.

The proportion of the torque limit load carried by the friction force on the sliding surfaces of the piston member 171 and the piston member accommodating hole 127, and the torque limit load carried by the resilient force of the resilient member 175, can be changed in such a configuration, too, by changing the orientation of the piston member 171 as required.

Figure 23:
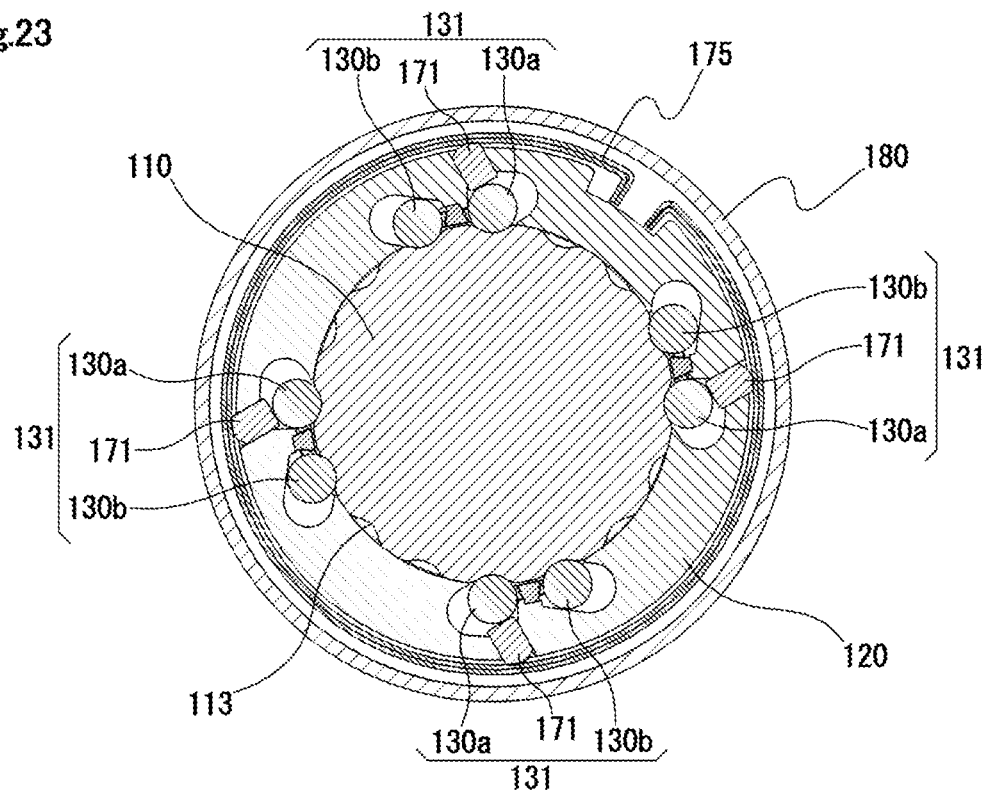
FIG. 23 is a cross-sectional view of a plane perpendicular to the rotation axis illustrating the configuration in yet another example of the positive clutch according to the first embodiment of the present invention.
Figure 24:
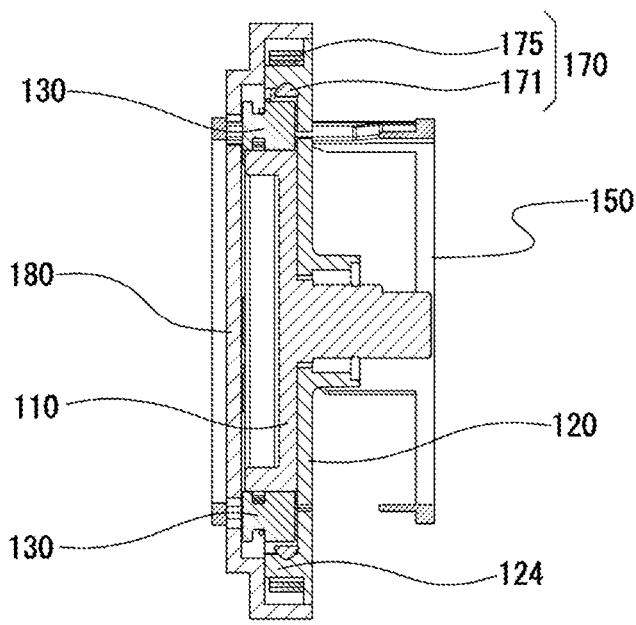
FIG. 24 is a cross-sectional view of a plane cut along the rotation axis of the positive clutch shown in FIG. 23.

While the resilient members in the torque limiter mechanism in the first to third embodiments described above are coil springs, the resilient member 175 may also be a plate spring such as the one in the torque limiter mechanism 170 shown in FIG. 23 and FIG. 24, as long as the resilient member is able to apply a constant load on the piston members.

This example shows another form of the positive clutch 100 according to the first embodiment in which the piston members 171 corresponding to the respective first rollers 130*a* of the plurality of roller pairs 131 are arranged such that ends thereof protrude more than the outer circumferential surface of the tubular part 124 of the outer race 120. The plate spring as the resilient member 175 is set along the outer circumferential surface of the tubular part 124 of the outer race 120 such as to bias each of the piston members 171 toward the inner race 110. Since the plurality of torque limiter mechanisms 170 share the resilient member 175, the number of components is reduced, and a size reduction is made easy.

In this positive clutch, when a torque exceeding a preset torque is input in the forward direction, for example, the resilient member 175 undergoes resilient radial expansion by the movement of the piston members 171, allowing the first rollers 130*a* to roll onto the outer circumferential surface of the inner race 110. The inner race 110 and outer race 120 are thus disengaged and the torque is released.

In the first to third embodiments described above, the positive clutch is configured to be switchable between three or four of the four operating modes, i.e., two-way lock mode, forward lock mode, reverse lock mode, and two-way free mode. Alternatively, the clutch may be configured to be switchable between two operating modes, i.e., two-way lock mode and two-way free mode.

Fourth Embodiment

Figure 25:
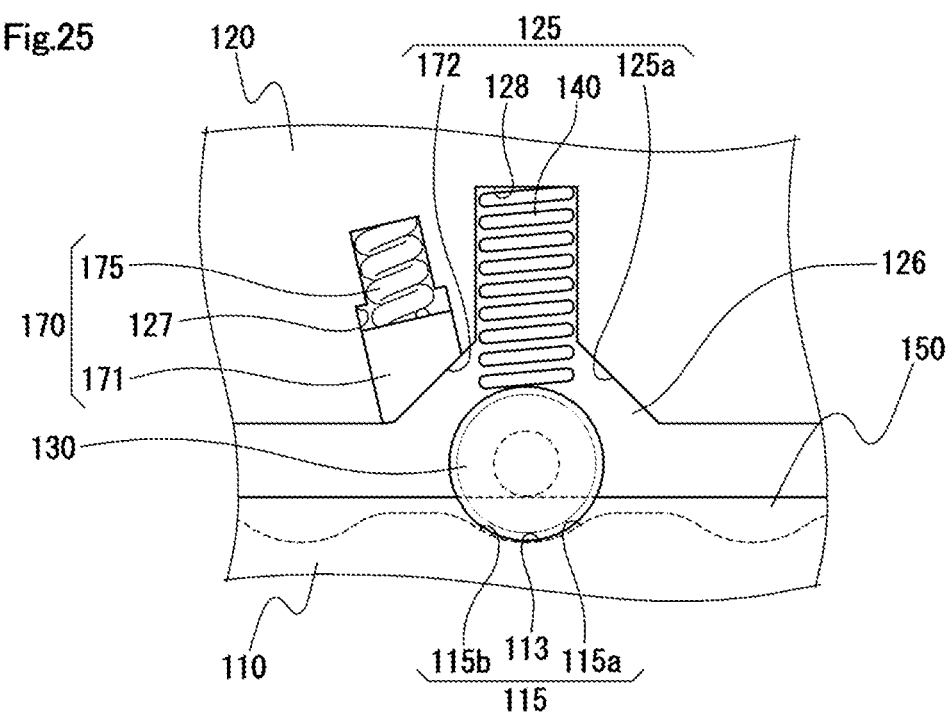
FIG. 25 is a schematic diagram illustrating the configuration of essential parts in one example of a positive clutch according to a fourth embodiment of the present invention.

FIG. 25 is a schematic diagram illustrating essential parts in one configuration example of a positive clutch according to a fourth embodiment of the present invention.

This positive clutch has a plurality of rollers 130 disposed at predetermined circumferential intervals between the coaxial and relatively rotatable inner race 110 and outer race 120.

Roller support parts 113 are formed at predetermined circumferential intervals on the outer circumferential surface of the inner race 110. A plurality of pocket parts 126 are formed in the inner circumferential surface of the outer race 120, each corresponding to each of the plurality of rollers 130.

The pocket part 126 includes a third slope portion 125*a* that is flat and extends at an angle in the reverse direction radially outwards, and a fourth slope portion that is flat and extends at an angle in the forward direction radially outwards. The third slope portion 125*a* forms part of the outer race slope portion 125 and holds the roller 130 between itself and the second slope portion 115*b* of the roller support part 113 in the circumferential direction.

Each pocket part 126 is formed with a spring accommodating hole 128 that extends continuously from the bottom of the pocket part 126 radially outwards.

The positive clutch of this embodiment includes a torque limiter mechanism 170 that limits the torque transmitted in the forward direction.

The torque limiter mechanism 170 includes a piston member 171 and a resilient member 175 that applies a constant load on the piston member 171. The piston member 171 in this embodiment is a columnar body with an inclined surface 172 that is formed by cutting one end of the column in a plane inclined to the center axis, while the resilient member 175 is a coil spring.

In this embodiment, the torque limiter mechanism 170 is accommodated in a piston member accommodating hole 127 formed in the fourth slope portion of the outer race 120. The piston member 171 is slidably accommodated, and the resilient member 175 is set with its coil axis oriented along the radial direction. The piston member 171 is oriented such that its inclined surface 172 faces the forward direction. The inclined surface 172 of the piston member 171 forms part of the outer race slope portion 125 and holds the roller 130 between itself and the first slope portion 115*a* of the roller support part 113 in the circumferential direction.

The biasing means 140 is composed of a plurality of coil springs, and, for example, each of the plurality of the biasing means corresponding to each of the plurality of rollers 130 is disposed in each of the spring accommodating holes 128 to freely expand and contract.

Figure 26:
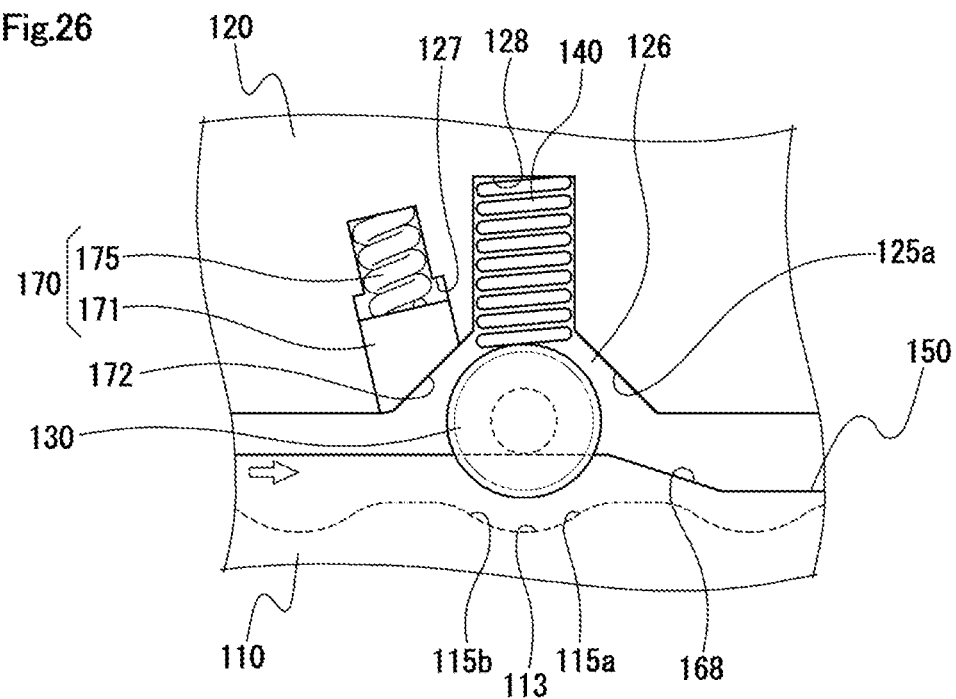
FIG. 26 is a schematic diagram illustrating the state of the positive clutch shown in FIG. 25 when the operating mode is the two-way free mode.

The switching member 150 is configured to be rotated independently of the rotation of the inner race 110 and outer race 120 such as to cause the rollers 130 to separate from the inner race 110, and includes a cam surface 168 with an outside diameter gradually increasing in the forward direction as the switching member 150 rotates (see FIG. 26).

In the positive clutch according to this embodiment, when the switching member 150 is in the non-operating state, the rollers 130 are maintained in the standby state where they can immediately start engaging with the inner race 110 and outer race 120 upon application of torque on either the inner race 110 or the outer race 120. The operating mode of the positive clutch in this state is therefore the two-way lock mode.

When the switching member 150 is rotated in the forward direction for example, as shown in FIG. 26, and fixed in the second fixed position, the rollers 130 are moved into the pocket parts 126 by the action of the cam surface 168 of the roller position changing part 160 against the biasing force of the biasing means 140. The rollers 130 are thus held in the position separated from the inner race 110, i.e., the operating mode of the positive clutch 100 is switched to the two-way free mode.

Figure 27A:
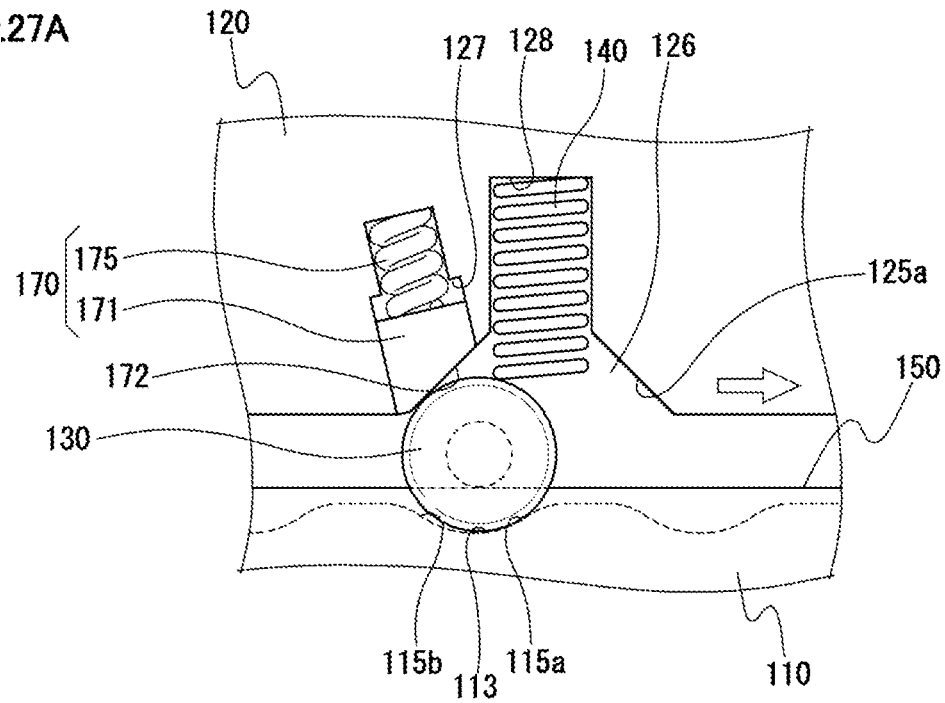
FIG. 27A is a diagram illustrating a state of the positive clutch shown in FIG. 25 in the two-way lock mode when the outer race is rotated in the forward direction.

In the positive clutch according to the fourth embodiment, when the operating mode is the two-way lock mode, rotating the outer race 120 in the forward direction, for example, causes each roller 130 to be held between the first slope portion 115*a* of the roller support part 113 that supports the roller 130, and the inclined surface 172 of the piston member 171, in the circumferential direction, as shown in FIG. 27A. Thus the inner race 110 engages with the outer race 120 and torque is transmitted.

Figure 27B:
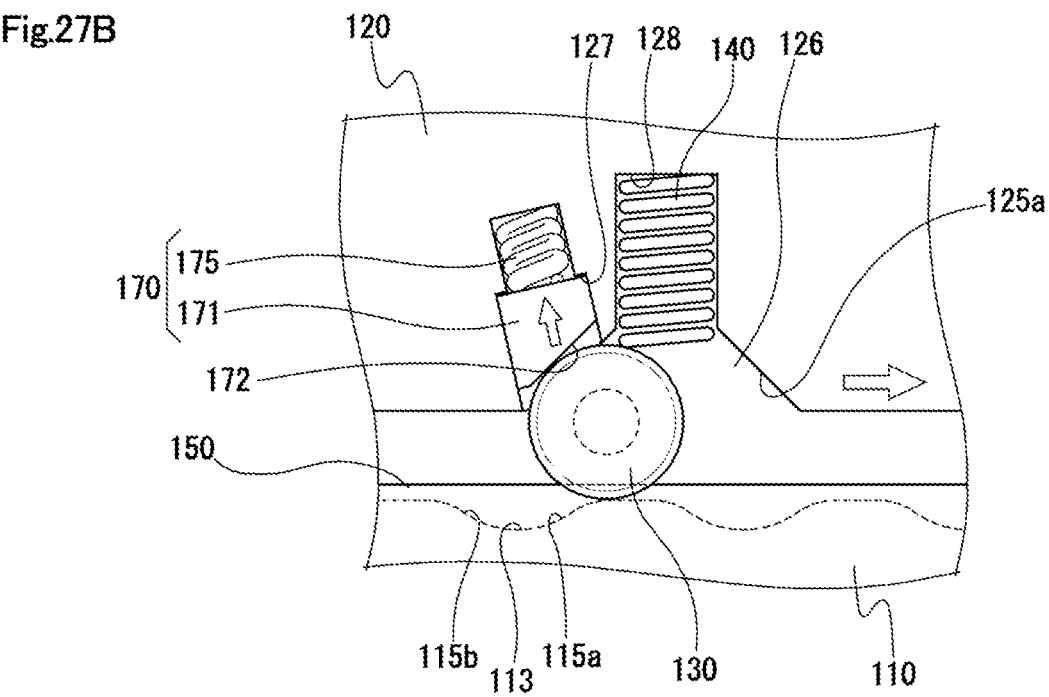
FIG. 27B is a diagram illustrating a state of the torque limiter mechanism activated upon input of a torque exceeding a preset torque to the outer race in the forward direction.

In the event of a torque exceeding the preset torque input in the forward direction as mentioned above, the torque limiter mechanism 170 acts to release the torque, and limits the amount of torque transmitted between the inner race 110 and the outer race 120, as shown in FIG. 27B.

Figure 27C:
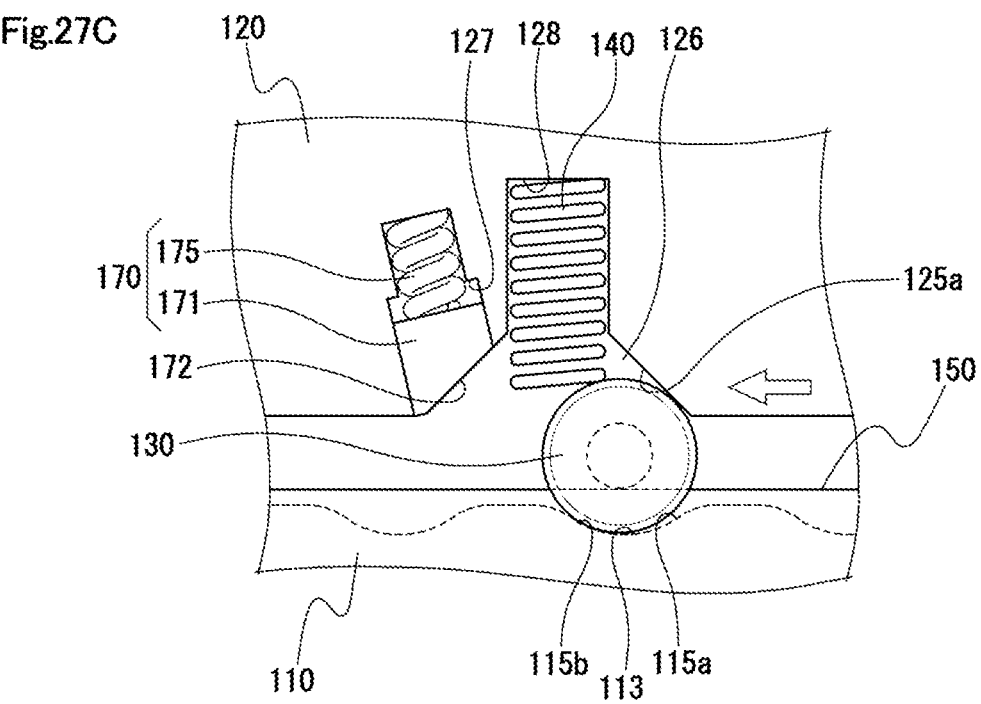
FIG. 27C is a diagram illustrating a state of the positive clutch shown in FIG. 25 in the two-way lock mode when the outer race is rotated in the reverse direction.

On the other hand, when the outer race 120 is rotated in the reverse direction, each roller 130 is held between the second slope portion 115*b* of the roller support part 113 and the third slope portion 125*a* of the outer race 120 in the circumferential direction as shown in FIG. 27C. Thus the inner race 110 engages with the outer race 120 and torque is transmitted.

When the operating mode of the positive clutch is the two-way free mode, the outer race 120 freewheels when rotated, whether in the forward direction or in the reverse direction.

In the positive clutch according to the fourth embodiment described above, a torque limiter mechanism 170 may be provided to each of the third and fourth slope portions of the pocket parts 126 as shown in FIG. 28, so that the positive clutch is configured to limit the torque in both forward and reverse directions.

While embodiments of the present invention have been described in detail, the present invention is not limited to the above-described embodiments and may be carried out with various design changes without departing from the scope of the present invention set forth in the claims.

For example, while the inner race is fixed and the outer race is rotated in the configurations described in respective embodiments, other configurations are also possible, such as an inner race being rotated relative to a fixed outer race, or the inner race and outer race being both rotatable.

In the embodiments described above, the roller support parts are formed in the outer circumferential surface of the inner race, while the pocket parts are formed in the inner circumferential surface of the outer race. Instead, the roller support parts may be formed in the inner circumferential surface of the outer race and the pocket parts may be formed in the outer circumferential surface of the inner race. In this configuration, a centrifugal force will act on the rollers in the roller support parts, so that the rollers will be held securely in the circumferential direction between the roller support parts and the slope portions of pocket parts on the inner race side during torque transmission, which can help achieve stable engagement.

What is claimed is:

1. A positive clutch comprising:
    an outer race and an inner race that are coaxial and rotatable relative to each other;
    a plurality of rollers disposed between the outer race and the inner race; and
    a biasing means radially biasing each of the plurality of rollers; and
    the outer race including a flat outer race slope portion extending at an angle to a circumferential direction, and the inner race including a flat inner race slope portion extending at an angle to the circumferential direction,
    each of the plurality of rollers prohibiting relative rotation of the outer race and the inner race by being held between the outer race slope portion and the inner race slope portion in the circumferential direction,
    the positive clutch further comprising a torque limiter mechanism that limits an amount of torque transmitted between the outer race and the inner race, wherein
    the torque limiter mechanism includes a piston member having an inclined surface that forms either one of the outer race slope portion or the inner race slope portion and that holds the roller between the inclined surface and the other one of the outer race slope portion or the inner race slope portion, and a resilient member that applies a constant load on the piston member, and the piston member is slidably accommodated in a piston member accommodating hole formed in the outer race or the inner race.

2. The positive clutch according to claim 1, wherein the plurality of rollers include a first roller held between the outer race slope portion and the inner race slope portion in the circumferential direction when the outer race is rotated in a forward direction or when the inner race is rotated in a reverse direction, and a second roller held between the outer race slope portion and the inner race slope portion in the circumferential direction when the outer race is rotated in the reverse direction or when the inner race is rotated in the forward direction, wherein a plurality of pocket parts, each corresponding to each of the plurality of rollers and configured to accommodate the rollers, are formed either on an inner circumferential surface of the outer race or on an outer circumferential surface of the inner race, the plurality of pocket parts each including a flat inclined surface that forms the outer race slope portion or the inner race slope portion, and wherein the positive clutch further comprises a switching member configured to switch operating modes of the positive clutch by causing one or both of the first roller and the second roller to move into corresponding pocket parts against a biasing force of the biasing means.

3. The positive clutch according to claim 1, wherein the torque limiter mechanism includes one or both of a forward torque limiter mechanism that limits torque transmitted in the forward direction and a reverse torque limiter mechanism that limits torque transmitted in the reverse direction.

4. The positive clutch according to claim 1, wherein the torque limiter mechanism includes a forward torque limiter mechanism that limits torque transmitted in the forward direction and a reverse torque limiter mechanism that limits torque transmitted in the reverse direction, the forward torque limiter mechanism and the reverse torque limiter mechanism sharing a piston member.

5. The positive clutch according to claim 1, wherein there is an angle difference between the inclined surface of the piston member and an inclined surface of the outer race slope portion or an inclined surface of the inner race slope portion that holds the roller together with the flat portion of the piston member.

6. The positive clutch according to claim 1, comprising a plurality of the torque limiter mechanisms, wherein the resilient member is a plate spring shared by the torque limiter mechanisms.

7. The positive clutch according to claim 1, wherein roller support parts are formed on one of an inner circumferential surface of the outer race and an outer circumferential surface of the inner race to support the rollers, the roller support parts each including a flat inclined surface forming the outer race slope portion or the inner race slope portion, and wherein the plurality of rollers include rollers that are circumferentially displaced from the roller support parts.

8. The positive clutch according to claim 7, wherein the roller support part has an opening edge that is chamfered as viewed in cross section.

9. The positive clutch according to claim 1, wherein the biasing means is a garter spring.

* * * * *